US011130916B2

(12) United States Patent
Barrai et al.

(10) Patent No.: US 11,130,916 B2
(45) Date of Patent: Sep. 28, 2021

(54) PYROLYSIS REACTOR APPROACH TEMPERATURE

(71) Applicant: ExxonMobil Chemical Patents Inc., Baytown, TX (US)

(72) Inventors: Federico Barrai, Houston, TX (US); Elizabeth G. Mahoney, Houston, TX (US); James R. Lattner, La Porte, TX (US); Thomas W. Pavia, Singapore (SG); John S. Coleman, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 26 days.

(21) Appl. No.: 16/321,508

(22) PCT Filed: Aug. 15, 2017

(86) PCT No.: PCT/US2017/046957
§ 371 (c)(1),
(2) Date: Jan. 29, 2019

(87) PCT Pub. No.: WO2018/044557
PCT Pub. Date: Mar. 8, 2018

(65) Prior Publication Data
US 2019/0153331 A1    May 23, 2019

Related U.S. Application Data

(60) Provisional application No. 62/486,545, filed on Apr. 18, 2017, provisional application No. 62/381,722, filed on Aug. 31, 2016.

(51) Int. Cl.
*C10G 9/26* (2006.01)
*C10G 9/00* (2006.01)
(Continued)

(52) U.S. Cl.
CPC ................... *C10G 9/26* (2013.01); *B01J 8/04* (2013.01); *B01J 8/0492* (2013.01); *B01J 8/0496* (2013.01);
(Continued)

(58) Field of Classification Search
CPC .. C10G 9/002; C10G 2400/20; B01J 19/2415; B01J 19/2485; B01J 8/04; B01J 8/0492; B01J 8/067; B01J 8/0496; B01J 8/06; B01J 2219/2413; B01J 2219/00162; B01J 2219/00159; B01J 2219/2428; B01J 2219/00123; B01J 2219/00076;
(Continued)

(56) References Cited

U.S. PATENT DOCUMENTS 9,499,457 B2    11/2016    Hershkowitz et al.
2007/0191664 A1    8/2007    Hershkowitz et al.
(Continued)

*Primary Examiner* — Prem C Singh
*Assistant Examiner* — Brandi M Doyle

(57) ABSTRACT

The invention relates to approach temperatures and approach temperature ranges that are beneficial in operating a pyrolysis reactor, to pyrolysis reactors exhibiting a beneficial approach temperature, to processes for carrying out hydrocarbon pyrolysis in a pyrolysis reactor having a beneficial approach temperature. The pyrolysis reactor can be, e.g., a reverse-flow pyrolysis reactor, such as a regenerative reverse-flow pyrolysis reactor.

22 Claims, 5 Drawing Sheets

(51) Int. Cl.
*B01J 19/24* (2006.01)
*B01J 8/04* (2006.01)
*B01J 8/06* (2006.01)

(52) U.S. Cl.
CPC .......... *B01J 8/06* (2013.01); *B01J 8/067* (2013.01); *B01J 19/2415* (2013.01); *B01J 19/2485* (2013.01); *C10G 9/002* (2013.01); *B01J 2208/0053* (2013.01); *B01J 2208/00309* (2013.01); *B01J 2208/00353* (2013.01); *B01J 2208/00513* (2013.01); *B01J 2208/00548* (2013.01); *B01J 2208/00938* (2013.01); *B01J 2208/065* (2013.01); *B01J 2219/00076* (2013.01); *B01J 2219/00117* (2013.01); *B01J 2219/00123* (2013.01); *B01J 2219/00159* (2013.01); *B01J 2219/00162* (2013.01); *B01J 2219/00166* (2013.01); *B01J 2219/2413* (2013.01); *B01J 2219/2428* (2013.01); *C10G 2400/20* (2013.01)

(58) Field of Classification Search
CPC .... B01J 2219/00117; B01J 2219/00166; B01J 2208/065; B01J 2208/00353; B01J 2208/00513; B01J 2208/00548; B01J 2208/0053; B01J 2208/00938; B01J 2208/00309

See application file for complete search history.

(56) References Cited

U.S. PATENT DOCUMENTS

| | | |
|---|---|---|
| 2007/0261991 A1 | 11/2007 | Beattie et al. |
| 2008/0210598 A1 | 9/2008 | Annamalai et al. |
| 2013/0150644 A1 | 6/2013 | Keusenkothen et al. |
| 2014/0102874 A1* | 4/2014 | Keusenkothen ..... B01J 19/0026 201/2 |
| 2016/0176781 A1 | 6/2016 | Hershkowitz et al. |

* cited by examiner

PYROLYSIS REACTOR APPROACH TEMPERATURE

CROSS-REFERENCE TO RELATED APPLICATIONS

This application is a National Stage Application of International Application No. PCT/US2017/046957 filed Aug. 15, 2017, which claims the benefit of U.S. Patent Application No. 62/486,545, filed Apr. 18, 2017, and U.S. Patent Application Ser. No. 62/381,722, filed Aug. 31, 2016, the contents of both of which are incorporated herein by reference. Cross reference is made to the following related patent applications: U.S. Patent Application Ser. No. 62/402,009, filed Sep. 30, 2016, U.S. Patent Application Ser. No. 62/466,050, filed Mar. 2, 2017, PCT Patent Application No. PCT/US2017/046871, filed Aug. 15, 2017 and PCT Patent Application No. PCT/US2017/046879, filed Aug. 15, 2017, which are incorporated by reference herein in their entirety.

FIELD

The invention relates to approach temperatures and approach temperature ranges that are beneficial in operating a pyrolysis reactor, to pyrolysis reactors exhibiting a beneficial approach temperature, to processes for carrying out hydrocarbon pyrolysis in a pyrolysis reactor having a beneficial approach temperature. The pyrolysis reactor can be, e.g., a reverse-flow pyrolysis reactor, such as a regenerative reverse-flow pyrolysis reactor.

BACKGROUND

In part as a result of their utility as feeds for producing desirable products, olefin demand continues to grow, particularly demand for light olefin such as ethylene, propylene, and butenes. Light olefin is typically manufactured in an olefins plant (e.g., an ethylene plant) which include production and recovery facilities. For example, an olefin production facility can include one or more steam cracker furnaces for steam cracking a hydrocarbon-containing feed to produce a process gas containing olefinic hydrocarbon. Olefinic hydrocarbon is separated from the process gas and recovered in a recovery facility that is typically adjacent to the steam cracker furnaces. Steam cracker furnaces generally have a convection section, in which the feed is preheated and combined with steam, and a radiant section in which the preheated steam-feed mixture is pyrolysed to produce the process gas. During pyrolysis mode operation, the feed is preheated and combined with steam in the convection section, and the preheated steam-feed mixture is pyrolysed in the radiant section to produce the process gas.

Coke and other deposits typically form in the steam cracking furnace internals during pyrolysis mode, e.g., in tubular members (typically called "furnace tubes") which convey the feed-steam mixture and resulting process gas through the radiant section. Coke accumulation is lessened by periodically operating the steam cracking furnace in regeneration mode. During regeneration mode, a flow of oxygenate-containing decoking fluid (e.g., a gaseous steam-air mixture) is substituted for the hydrocarbon-containing feed. The decoking fluid flows through the furnace tubes and associated furnace piping, internals, etc., to at least partly remove deposited coke. After sufficient coke removal is achieved, the steam cracking furnace is returned to pyrolysis mode operation.

To decrease undesired side-reactions which can convert desired light olefin to less desired products, and to lessen thermal stresses on upstream components of the recovery facility, the process gas is generally quenched at a location upstream of the recovery facility, e.g., at or near the furnace's process gas outlet. For example, U.S. Patent Application Publication No. 2007-0261991 discloses quenching the process gas by an indirect transfer of heat from the process gas to water in one or more transfer line heat exchangers ("TLE"). Saturated steam from the TLE is conducted to a steam drum. Condensed water in the steam drum is recycled to the TLE, typically via thermo-syphoning. A portion of the saturated steam can be conducted away from the steam drum for superheating in one or more superheater tubes positioned in the furnace's convection section. The quenched process gas is typically compressed in a process gas compressor located in the olefin plant's recovery facility, e.g., for more effective product separations. U.S. Patent Application Publication No. 2008-0210598 discloses using shaft power derived from a steam turbine to power the process gas compressor. Superheated steam exiting the convection section's superheater tubes can be utilized as a steam source for the steam turbine.

In order to increase energy efficiency and improve the yield of light unsaturated hydrocarbon, processes have been developed which carry out the pyrolysis in a regenerative pyrolysis reactor instead of or in addition to a steam cracking furnace. Such reactors generally includes a regenerative thermal mass having at least one internal channel. The thermal mass is preheated, and then a flow of the hydrocarbon-containing feed is established through the channel. Heat is transferred from the thermal mass to the hydrocarbon feed, which increases the hydrocarbon feed's temperature and results in conversion of at least a portion of the feed by pyrolysis. Feed pyrolysis produces the pyrolysis product, which comprises light olefin and other hydrocarbon, including coke. At least a portion of the coke remains in the passages of the thermal mass, and the remainder of the pyrolysis product is conducted away from the reactor as the process gas. Since the pyrolysis is endothermic, pyrolysis mode operation will eventually cool the thermal mass, e.g., to a temperature at which the pyrolysis reactions terminate. The ability to carry out pyrolysis reactions is restored by regenerating the thermal mass during a heating mode. During heating mode, the flow of hydrocarbon-containing feed to the regenerative pyrolysis reactor is terminated. Flows of oxidant and fuel are established to the reactor, typically in a direction that is the reverse of the feed flow direction. The reactor is reheated by combustion of the fuel and oxidant, which transfers heat to the thermal mass. After sufficient heat is transferred, the reactor is switched from heating mode to pyrolysis mode. For ease of operation, e.g., to lessen the complexity of flow-control apparatus associated with the regenerative reactor, it is generally desirable for the time duration of pyrolysis mode ("$t_P$") and the time duration of heating mode ("$t_H$") to each be more than about one second. As in the case of steam cracking furnaces, olefinic hydrocarbon is typically separated and recovered from the process gas in an olefin recovery facility which includes as process gas compressor.

More recently, U.S. Pat. No. 9,499,457 discloses increasing ethylene yield from a regenerative pyrolysis reactor by operating the pyrolysis mode in a regenerative pyrolysis reactor at a temperature in the range of 850° C. to 1200° C., a hydrocarbon partial pressure ≥7 psia (48 kPa), and a residence time ≥0.001 second. The reference (e.g., in its FIG. 1A) discloses controlling the pyrolysis mode for increased ethylene selectivity and decreased selectivity for coke and methane by establishing a sharp thermal gradient in the bulk gas temperature profile between a region of substantially constant temperature at which the pyrolysis can occur and a substantially constant lower temperature at which pyrolysis does not occur. Although utilizing such pyrolysis conditions decreases coke yield as compared with steam cracking, some coke does accumulate in the channel. Advantageously, the reference reports that accumulated coke can be oxidized to volatile products such as carbon dioxide during heating mode by combustion using a portion of the oxidant in the oxidant flow. Energy efficiency is increased over steam cracking because (i) heating is not needed during pyrolysis mode and (ii) heat released by coke combustion in passages of the thermal mass during heating mode aids thermal mass regeneration. Although the process is more energy efficient than steam cracking, maintaining a sharp temperature gradient in the bulk gas temperature profile leads to substantially constant ethylene and $C_{3+}$ hydrocarbon yields during pyrolysis mode.

Energy efficient processes are now desired which have flexibility to (i) maintain a favorable feed conversion and (ii) produce a range of light olefin yields during pyrolysis mode, but without excessive coke yield, while operating in practical ranges of temperature, pressure, residence time, and cycle time.

SUMMARY OF THE INVENTION

The invention is based in part on the development of energy-efficient processes for pyrolysing hydrocarbon to produce desirable unsaturated compounds, including desirable light olefin compounds such as ethylene, propylene, butylenes, etc. The invention is based in part on the discovery that when pyrolysis is carried out in a thermal pyrolysis reactor having the form of an elongated tube, light olefin yield is not significantly affected by process conditions such as temperature, pressure, and flow rate at openings located at opposed ends of the tube reactor. As a result, pyrolysis conditions during pyrolysis mode and/or heating conditions during heating mode can be selected to provide improved thermal integration of the pyrolysis reactor with adjacent facilities for supplying feed to the reactor and for recovering desirable products from the process gas. The improved thermal integration, in turn, lessens the need for feed pre-heating and external quenching of the process gas (e.g., in TLEs) that are used in conventional processes. Unexpectedly, it has also been found that the desired conditions proximate to the opposed openings, particularly the average temperature at these locations, can be achieved at practical time durations of the heating and pyrolysis steps, and particularly at practical temperature, pressure, and residence time during pyrolysis mode.

Accordingly, certain aspects of the invention relate to a process for pyrolysing a hydrocarbon-containing feed in an elongated thermal pyrolysis reactor. The reactor comprises an internal volume which includes a pre-heated first heat transfer zone, a pre-cooled second heat transfer zone, and a pre-heated reaction zone located between the first and second heat transfer zones. The reactor also includes opposed first and second openings in fluidic communication with the internal volume. The pyrolysis mode is carried out during a pyrolysis time interval $t_P$ that is $\geq 0.01$ second. During pyrolysis mode, the hydrocarbon-containing feed is introduced toward the first heat transfer zone. The reactor at the start of $t_P$ has an approach temperature ($\Delta T_a$) proximate to the first opening that is $\leq 50°$ C. Heat is transferred from the reactor to the feed in the first heat transfer zone. This cools the first heat transfer zone and heats the feed to a feed bulk gas feed temperature that is substantially equal to a minimum pyrolysis temperature ($T_{MIN}$) wherein $T_{MIN}$ is $\geq 800°$ C. At least a portion of the heated feed's hydrocarbon is pyrolysed in the reaction zone under pyrolysis conditions including a pyrolysis bulk gas temperature$\geq T_{MIN}$. The pyrolysis cools the reaction zone and produces a pyrolysis product comprising coke, molecular hydrogen, and ethylene. Heat is transferred from the pyrolysis product to the reactor in the second heat transfer zone, which cools the pyrolysis product, deposits coke in the second heat transfer zone, and produces a process gas comprising at least a portion of the pyrolysis effluent's molecular hydrogen and ethylene. The process gas is conducted out of the second opening and away from the reactor. The process gas has a bulk gas temperature of $\leq 600°$ C. proximate to the second opening at the start of $t_P$. The temperature at the second opening is sufficiently low that the process gas can be conducted directly to a quench tower or combined quench-tower/primary fractionator in the olefin recovery facility, obviating the need for a transfer line exchanger upstream of the quenching.

In other aspects, the invention relates to a hydrocarbon pyrolysis process carried out in an elongated reverse-flow thermal pyrolysis reactor which alternates in pyrolysis mode carried out for a time duration $t_P$ and heating mode carried out for a time duration $t_H$. The heating mode is carried out in an average flow direction that is substantially the reverse of that of pyrolysis mode. The reactor has a first approach temperature $\Delta T_a^1$ proximate to the first opening that is $\leq 50°$ C. at the start of $t_P$, and a second approach temperature $\Delta T_a^2$ that is $\leq 125°$ C. proximate to the second opening at the start of $t_H$.

In still other aspects, the invention relates to a reverse-flow thermal pyrolysis reactor for carrying out any of the preceding aspects, and to the pyrolysis products produced by the pyrolysis of any of the preceding aspects.

DETAILED DESCRIPTION

Figure 1A:
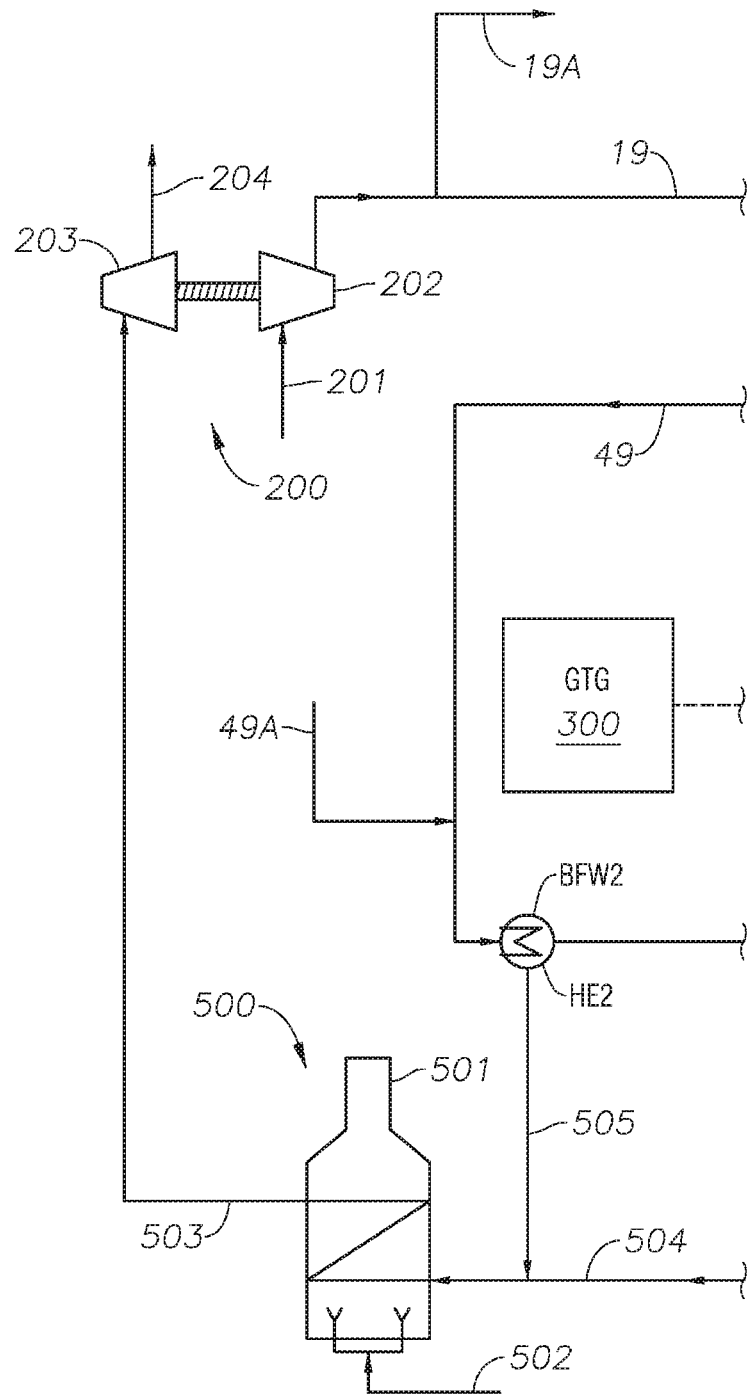
FIG. 1, which is separated into parts A and B for clarity, schematically shows one form of an apparatus for carrying out aspects of the invention.

Certain aspects of the invention relate to processes, systems, and apparatus for producing a compressed process gas comprising light olefin such as ethylene. The process utilizes a pyrolysis reactor, e.g., an elongated tubular flow-through reactor, to produce the process gas. A power generator, e.g., a gas turbine generator, produces power to facilitate recovery of desired products from the process gas. A compression stage located in the recovery facility uses power from the power generator to compress the process gas in at least one process gas compressor.

Certain features of regenerative reverse-flow thermal pyrolysis reactors make this form of reactor particularly suitable for producing the process gas. When pyrolysis mode is carried out under conditions which establish an appropriate approach temperature $\Delta T_a$ during heating mode, heat recovered and stored in the reactor during pyrolysis mode is transferred to fuel and/or air. This transfer makes the reactor more efficient by lessening the amount of heat that would otherwise need to be supplied to the reactor during heating mode. Likewise, when heating mode is carried out under conditions which establish an appropriate approach temperature $\Delta T_a$ during pyrolysis mode, heat recovered and stored in the reactor during heating mode is efficiently transferred to the pyrolysis feed. This in turn beneficially lessens or entirely obviates the need for external quenching (e.g., in one or more TLEs) of the pyrolysis product. Surprisingly, it has been found that these approach temperatures can be established without appreciably degrading the yield of desirable light olefin produced by the pyrolysis. Certain desirable features of regenerative reverse-flow thermal pyrolysis reactors will now be explained in more detail with reference to FIG. 1 (FIG. 1A for stages 200, 300, and 500; and FIG. 1B for stages 50 and 450).

Conceptually, regenerative reverse-flow thermal pyrolysis reactor 50 encompasses a reaction region 106 which is abutted by first 102 and second 103 heat transfer zones. The reaction region encompasses a pyrolysis zone 104 and a combustion zone 105. These zones are shown schematically in FIG. 1B when the reactor operates in combustion mode (upper part of figure) and pyrolysis mode (lower part of figure). The heat transfers arrows are shown as they are oriented during pyrolysis mode: from the first heat transfer zone to feed 15 and from the pyrolysis product to the second heat transfer zone. The figure is conceptual in that, e.g., the pyrolysis zone and combustion zone can occupy substantially the same (or overlapping) physical space within the reactor, albeit at different times. Methods used to establish initial conditions in these zones at the start of operation are not critical. For example, if the reactor is to begin in pyrolysis mode, conventional methods can be used to preheat the reactor's first heat transfer zone and precool the second heat transfer zone, but the invention is not limited thereto. During pyrolysis mode, which operates in an average flow direction of substantially from right to left as shown, heat is transferred from the reactor to feed 15 in first heat transfer zone 102. Sufficient heat is transferred in the first heat transfer zone to pyrolyse the heated feed in pyrolysis zone 104. Effluent from the pyrolysis zone (pyrolysis product) is cooled by a transfer of heat to the reactor in second heat transfer zone 103, which rapidly quenches the pyrolysis product. Condensable constituents that may be present in the pyrolysis product typically deposit in the second heat transfer zone. The process gas, which typically comprises the remainder of the pyrolysis product, is conducted away via line 49 as shown. The pyrolysis is carried out for a time $t_P$ under pyrolysis conditions which establish a desired (typically predetermined) approach temperature at the start of $t_H$ at reactor location Y. Since the pyrolysis is on average endothermic, pyrolysis mode is periodically switched to heating mode, which reheats the reactor for continued pyrolysis and to establish a desired (typically predetermined) approach temperature at reactor location X. A useful feature of regenerative reverse-flow thermal pyrolysis reactors is that at least part of the heat removed from the pyrolysis product during the quenching (less any radiative, conductive, and convective losses) is stored in the reactor's second heat transfer zone and is available for transfer during regeneration mode operation. Another useful feature is that at least part of the heat removed from the combustion effluent during the quenching (again, less any radiative, conductive, and convective losses) is stored in the reactor's first heat transfer zone and is available for transfer during pyrolysis mode operation. These features are also illustrated schematically in FIG. 1.

During regeneration mode, which is carried out in an average flow direction that is substantially the reverse of the pyrolysis flow direction, oxidant and fuel are introduced into the reactor via line 19, which typically comprises substantially separate fuel channels and oxidant channels. The fuel and oxidant are conveyed through the second heat transfer zone toward the combustion zone. Sufficient heat is transferred from the reactor in second heat transfer zone 103 to the fuel and air for these to combust in combustion zone 105. Heat is transferred from the combustion effluent to reactor first heat transfer zone 102. Thus, the first and second heat transfer zones are regenerated for a following forward-flow thermal pyrolysis interval, and the desired approach temperature is established at reactor location X for carrying out pyrolysis mode.

These and related components will now be described in more detail with reference to the following definitions, which shall apply to this description and appended claims.

Definitions

For the purpose of this description and appended claims, the following terms are defined.

The term "$C_n$" hydrocarbon means hydrocarbon having n carbon atom(s) per molecule, wherein n is a positive integer. The term "$C_{n+}$" hydrocarbon means hydrocarbon having at least n carbon atom(s) per molecule. The term "$C_{n-}$" hydrocarbon means hydrocarbon having no more than n carbon atom(s) per molecule. The term "hydrocarbon" means a class of compounds containing hydrogen bound to carbon, and encompasses (i) saturated hydrocarbon, (ii) unsaturated hydrocarbon, and (iii) mixtures of hydrocarbons, and including mixtures of hydrocarbon compounds (saturated and/or unsaturated), such as mixtures of hydrocarbon compounds having different values of n.

The terms "alkane" and "paraffinic hydrocarbon" mean substantially-saturated compounds containing hydrogen and carbon only, e.g., those containing ≤1% (molar basis) of unsaturated carbon atoms. The term "unsaturate" and "unsaturated hydrocarbon" refer to one or more $C_{2+}$ hydrocarbon compounds which contain at least one carbon atom directly bound to another carbon atom by a double or triple bond. The term "olefin" refers to one or more unsaturated hydrocarbon compound containing at least one carbon atom directly bound to another carbon atom by a double bond. In other words, an olefin is a compound which contains at least one pair of carbon atoms, where the first and second carbon atoms of the pair are directly linked by a double bond.

The terms "reactor", "reactor system", "regenerator", "recuperator", "regenerative bed", "monolith", "honeycomb", "reactant", "fuel", and "oxidant" have the meanings disclosed in U.S. Pat. No. 7,943,808, which is incorporated by reference herein in its entirety. A "pyrolysis reactor" is a reactor, or combination of reactors or a system for hydrocarbon pyrolysis. The term "pyrolysis stage" means at least one pyrolysis reactor, and optionally including means for conducting one or more feeds thereto and/or one or more products away therefrom. A "region" or "zone" is a location, e.g., a specific volume, within a reactor, a location between two reactors and/or the combination of different disjointed locations in one or more reactors. A reaction zone is a zone is a region of the reactor where a reaction is carried out, e.g., a pyrolysis reaction during pyrolysis mode and a combustion reaction during heating mode. The pyrolysis region in the reaction zone can encompass the entire reaction zone, or just part, e.g., a segment. Likewise, the combustion zone can encompass the entire reaction zone, or just part of it. Although the pyrolysis region can occupy the same portion of the reaction zone as the combustion region, this is not required. The pyrolysis region can be a greater or lesser part of the reaction zone than the combustion region, but is typically greater. Heat transfer to and/or from the reactor can occur in the reaction zone and also in one or more heat transfer zones. Appreciable pyrolysis does not occur in a heat transfer zone during pyrolysis mode, nor does appreciable fuel combustion occur in the heat transfer region during heating mode (although coke combustion may occur). Heat transfer can occur in the reaction zone, e.g., when pyrolysis occurs at a location in the reaction zone which contains or is proximate to components, such as at least one thermal mass, which provides heat for the pyrolysis. A reactor or reaction stage can encompass one or more reaction regions. More than one reaction can be carried out in a reactor, stage, or region. The term open frontal area ("OFA") has the same meaning as in U.S. Pat. No. 5,494,881, which is incorporated by reference herein in its entirety.

A pyrolysis region can include components having conduits, channels, and passages. The term "conduit" refers to means for conducting a composition from one location to another. The term encompasses (i) elementary conducting means, such as a pipe or tube, and (ii) complex means such as tortuous pathways through conducting means, e.g., pipes, tubes, valves, and reactors, that are filled with random packing. The term "passage" means a geometrically contiguous volume element that can be utilized for conveying a fluid within a reactor, regenerator, recuperator, regenerative bed, monolith, honeycomb, etc. The term "channel" means a plurality of passages that can be utilized together for conveying a fluid within the reactor, regenerator, recuperator, regenerative bed, monolith, honeycomb, etc. For example, a honeycomb monolith can comprise a single channel, with the channel having a plurality of passages or sets of passages.

The term "bulk gas temperature" means the temperature of a bulk gas steam as measured by a device (such as a thermocouple) that is in contact with the bulk gas but not in contact with a solid thermal mass. For example, if the gas is traveling through an internal channel of length $L_c$ of a thermal mass in the pyrolysis zone of a thermal pyrolysis reactor, the bulk gas temperature at a location along $L_c$ is the average temperature (arithmetic mean) over the channel's cross sectional area at that location. The peak gas temperature ("$T_p$") is the greatest cross-sectional-averaged bulk gas temperature achieved along a flowpath. The pyrolysis conditions typically include a $T_p$ located within the reactor, preferably within the pyrolysis zone. One skilled in the art will appreciate that a gas temperature immediately proximate to a solid thermal mass, such as a partition between passages within a thermal mass at any particular location may exceed the bulk gas temperature, and may, in some infinitesimal layer, actually approach the solid's temperature. The average bulk gas temperature "$T_{av}$" over a region of the reactor, e.g., of the pyrolysis zone, is obtained using the formula:

$$Tav = \left[\frac{1}{b-a}\int_a^b T(x)dx\right].$$

Parameters a and b are the boundaries of an interval (distance) along the long axis of the reactor. For example, referring to FIG. 2, parameter "a" can be the position of aperture 50 and parameter "'b'" can be the position of aperture 9. T(x) is a function representing the variation of bulk gas temperature over the interval of from a to b. When T(x) is a bulk gas temperature profile of a pyrolysis zone, e.g., the pyrolysis zones indicated (at the start of $t_P$) by the shaded regions in FIG. 3, parameters a and b are the locations where the bulk gas temperature profile intersects the line $T_{MIN}$, which corresponds to the minimum temperature at which feed conversion is ≥10% under the selected pyrolysis conditions and feed. Since the bulk gas temperature profile typically changes during the pyrolysis time interval $t_P$, as shown in FIG. 3, $T_{av}$ will typically decrease during $t_P$. The portion of the profile having a temperature ≥$T_{MIN}$ can be continuous, but this is not required. For example, when a profile that intersects $T_{MIN}$ at more than two locations in the pyrolysis zone (e.g., a, b) and touches $T_{MIN}$ at a location c (not shown, but between a and b), additional integrations are carried out, e.g.:

$$Tav = \frac{1}{b-a}\int_a^b T(x)dx + \frac{1}{c-b}\int_b^c T(x)dx.$$

When the portion of the profile that is ≥$T_{MIN}$ is in the form of discrete segments, the integrations are performed over each of the segments. The "approach temperature" is determined at a location within a heat transfer region, typically proximate to a location where feed enters the reactor during pyrolysis mode. A second approach temperature can be determined at a location where oxidant enters the reactor during combustion mode. Typically, approach temperature is determined from conditions existing at the start of pyrolysis mode and at the start of combustion mode. For example, referring to FIGS. 2-4, a first approach temperature $\Delta T_a$ can be determined at the start of pyrolysis mode at a location ("X", not shown) that is proximate to aperture 3, proximate to opening 51, or proximate to a location therebetween. Likewise, a second $\Delta T_a$ can be determined at the start of combustion mode at a location ("Y", not shown) that is proximate to aperture 9, proximate to opening 52, or proximate to a location therebetween. The first $\Delta T_a$ at location X proximate to where feed approaches the reactor is defined as $\Delta Ta = [\int_{t1}^{t2} TsdT] - T\text{feed}$ Parameter $t_1$ is the time at the start of heating mode (the start of $t_H$), and $t_2$ is the time at the end of heating mode (the end of $t_H$), $T_s$ is the solids temperature at location X, and $T_{feed}$ is the temperature of air feed at location X. The second $\Delta T_a$ at a location Y proximate to where air approaches the reactor during heating mode is defined as $\Delta Ta = [\int_{t3}^{t4} TsdT] - T\text{air}$ Parameter $t_3$ is the time at the start of pyrolysis mode (the start of $t_P$), and $t_4$ is the time at the end of pyrolysis mode (the end of $t_P$), $T_s$ is the solids temperature at location Y, and $T_{air}$ is the temperature of the air at location Y. When $T_s$ as a function of time at location X during $t_H$ has a triangular shape, the integral can be generally approximated by [$T_x$* (0.5*$t_H$)], where $T_x$ is the greatest solids temperature achieved at location X during $t_H$. Likewise, when $T_s$ as a function of time at location Y during $t_P$ has a triangular shape, the integral can be generally approximated by [$T_y$* (0.5*$t_P$)], where $T_y$ is the greatest solids temperature achieved at location Y during $t_P$. The temperature of solids associated with the reactor can be determined using conventional methods, e.g., thermocouple measurements, but the invention is not limited thereto. The first $\Delta T_a$ is represented by the symbol $\Delta T_a^1$, and the second $\Delta T_a$ is represented by the symbol $\Delta T_a^2$.

The term "selectivity" refers to the production (weight basis) of a specified compound in a reaction. As an example, the phrase "a hydrocarbon pyrolysis reaction has 100% selectivity for methane" means that 100% of the hydrocarbon (weight basis) that is converted in the pyrolysis reaction is converted to methane. When used in connection with a specified reactant, the term "conversion" means the amount of the reactant (weight basis) consumed in the reaction. For example, when the specified reactant is ethane, 100% conversion means 100% of ethane is consumed in the reaction. With respect to hydrocarbon pyrolysis the term "conversion" encompasses any molecular decomposition by at least pyrolysis heat, including cracking, breaking apart, and reformation. Average conversion in a reaction zone, e.g., a pyrolysis zone, is the conversion achieved at $T_{av}$. Yield (weight basis) is conversion times selectivity.

The term "pyrolysis" means an endothermic reaction for converting molecules into (i) atoms and/or (ii) molecules of lesser molecular weight, and optionally (iii) molecules of greater molecular weight, e.g., processes for converting ethane and/or propane to molecular hydrogen and unsaturates such as ethylene, propylene and acetylene. Certain aspects of the invention feature a pyrolysis zone exhibiting selectivities (e.g., of desired products) which vary as a function of position along the length of the pyrolysis zone but which do not vary appreciably as a function of time during pyrolysis mode, e.g., within about +/−25%, such as +/−10%, or +/−5% from selectivity at the start of $t_P$. More particularly, for certain aspects in which $T_{av}$ and/or $T_p$ decrease by ≤100° C. during pyrolysis mode, the yield of many desired products, e.g., light olefin yield, such as ethylene and/or propylene yield, do not vary appreciably as a function of time during pyrolysis mode even though the product selectivities vary as a function of position along the length of the pyrolysis zone. For example, yield is typically within about +/−25%, such as +/−10%, or +/−5% of yield at the start of $t_P$. In these aspects, average conversion might not vary appreciably as a function of time during pyrolysis mode, and is typically within about +/−25%, such as +/−10%, or +/−5% of average conversion at the start of $t_P$.

A hydrocarbon feed is subjected to "thermal pyrolysis" when <50.0% of the heat utilized by the pyrolysis is provided by exothermically reacting the hydrocarbon feed, e.g., with an oxidant, e.g., ≤10%, such as ≤1%. Typically, a thermal pyrolysis reactor derives ≥90% of the heat need for the pyrolysis from heat stored within solids associated with the reactor, e.g., ≥95%, such as ≥99%. The "severity threshold temperature" for pyrolysis is the lowest bulk gas temperature at which acetylene selectivity is at least 10% for a residence time ≤0.1 second. High-severity pyrolysis conditions are those carried out at a peak gas temperature that is greater than or equal to the severity threshold temperature. Low-severity pyrolysis conditions are those carried out at a peak gas temperature that is less than the severity threshold temperature, i.e., conditions under which substantially no hydrocarbon pyrolysis is carried out at a pyrolysis gas temperature that exceeds the severity threshold temperature. High-severity conditions include those which exhibit (i) a methane selectivity ≥5 wt. % and/or (ii) a propylene selectivity at a temperature ≥1000° C. of ≤0.6 wt. %. With respect to pyrolysis reactors, the term "residence time" means the average time duration for non-reacting (non-converting by pyrolysis) molecules (such as He, $N_2$, Ar) having a molecular weight in the range of 4 to 40 to traverse a pyrolysis region of a pyrolysis reactor, whether or not such molecules are actually present in the pyrolysis region.

The term "Periodic Table" means the Periodic Chart of the Elements, as it appears on the inside cover of The Merck Index, Twelfth Edition. Merck & Co., Inc., 1996.

Certain aspects of the invention relate to carrying out pyrolysis mode and heating mode under the specified conditions in one or more reverse flow reactors. Representative reverse flow reactors such as reactor 50 of FIG. 1B will now be described in more detail with reference to FIG. 2. The invention is not limited to these aspects, and this description is not meant to foreclose the use of other reactors within the broader scope of the invention.

Representative Reverse Flow Reactors

Reverse-flow reactor 50 can be in the form of an elongated tubular vessel having an internal volume which includes a pyrolysis zone for carrying out the pyrolysis. The reactor vessel's cross sectional shape and/or cross sectional area can be substantially uniform over the length of the reactor, but this is not required. For example, one or more segments of the reactor vessel's length can have a circular, elliptical, or polygonal cross section. Reactor 50 has opposed first and second openings 51 and 52 which are in fluidic communication with the internal volume and are located at terminal ends of the reactor vessel.

The reactor 50 includes first and second thermal masses 1 and 7 for transferring heat to/from reactants and products during the pyrolysis and heating modes. Typically, the thermal mass comprises bedding or packing material that is effective for storing and transferring heat, such as glass or ceramic beads or spheres, metal beads or spheres, ceramic (e.g., ceramics, which may include alumina, yttria, and zirconia) or honeycomb materials comprising ceramic and/or metal, other forms of tubes comprising ceramic and/or metal, extruded monoliths and the like. The thermal masses and regenerative beds containing thermal masses are typically refractory channeled members such as those described in U.S. Pat. Nos. 8,754,276; 9,126,882; 9,346,728; 9,187,382; 7,943,808; 7,846,401; 7,815,873; 9,322.549; and in U.S. Patent Application Publications Nos. 2007-0144940; 2008-300438; 2014-303339; 2014-163287; 2014-163273; 2014-0303416; 2015-166430; 2015-197696; and 2016-176781. These references are incorporated by reference herein in their entireties. For improved selectivity to desired products during pyrolysis, it is desirable for $T_p$ and/or $T_{av}$ to decrease by no more than about 100° C., and preferably ≤75° C. during $t_P$. When the bulk gas temperature profile in the pyrolysis zone exhibits a plurality of peaks, the peak having the greatest temperature is designated $T_p$. Should the pyrolysis zone exhibit two or more peaks of substantially the same temperature, they can be designated $T_p^1$, $T_p^2$. $T_p^3$, etc., and it is desirable that each decreases by no more than about 100° C., and preferably ≤75° C. during $t_P$. It has been found that $T_p$ and $T_{av}$ do not decrease by more than about 100° C. for a wide range of pyrolysis conditions when the OFA of at least thermal mass 1 is ≤55%. e.g., ≤45%, such as ≤40%, or ≤35%. To prevent an undesirably large pressure drop across the reactor, the OFA of thermal mass 1 is typically ≥10%, e.g., in the range of about 10% to 55%, e.g., 10% to 50%, such as 10% to 45%, or 10% to 35%.

The thermal mass typically has a thermal conductivity in the range of from 0.5 W/m° K to 50 W/m° K, a coefficient of thermal expansion in the range of from $1\times10^7$/K to $2\times10^{-5}$/° K, and an average wetted surface area per unit volume in the range of from 1 $cm^{-1}$ to 100 $cm^{-1}$. The channel of the first thermal mass typically includes a plurality of substantially parallel passages, e.g., at a passage density of from 77000/m² to 1.3×10⁶/m². The thermal typically mass comprises refractory, e.g., one having a specific heat capacity at 300° K that is ≥0.04 [kj/(° K kg)], such as in the range of from 0.04 [kj/(° K kg)] to 1.2 [kj/(° K kg)], and a mass density ≥3000 kg/m³, such as in the range of from 3000 kg/m³ to 5000 kg/m³.

The choice of refractory composition is not critical, provided it is capable of surviving under pyrolysis mode and heating mode conditions for practical run lengths (e.g., months) without significant deterioration or decomposition. Those skilled in the art will appreciate that the compositions of the first and second thermal masses should be selected from among those that substantially maintain integrity (structural and compositions) and functionality during long term exposure to pyrolysis feeds, products, and reaction conditions, e.g., temperatures ≥750° C., such as ≥1200° C., or for increased operating margin ≥1500° C. Conventional refractories can be used, including those comprising at least one oxide of one or more elements selected from Groups 2-14 of the Periodic Table, but the invention is not limited thereto. In particular aspects, the refractory includes oxide of at least one of Al, Si, Mg, Ca, Fe, Mn, Ni, Co, Cr, Ti, Hf, V, Nb, Ta, Mo, W, Sc, La, Yt, Zr, and Ce. Alternatively or in addition, the refractory can include non-oxide ceramic.

Figure 2:
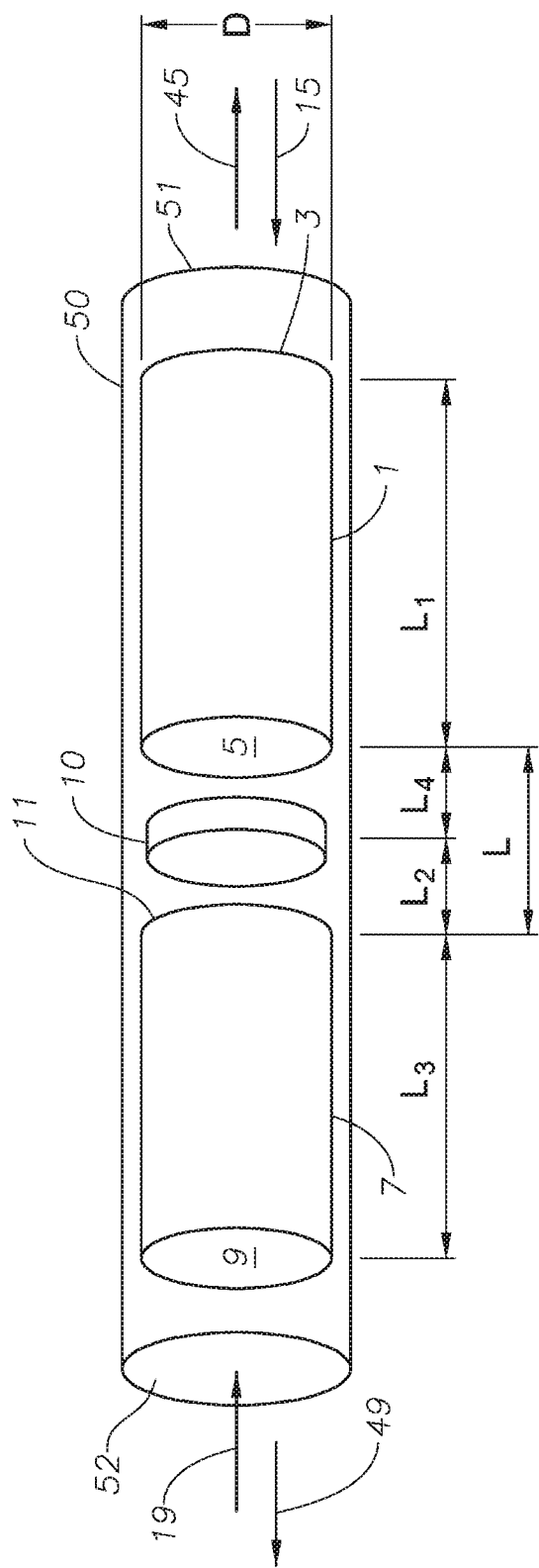
FIG. 2 schematically shows one form of a reverse flow reactor that is suitable for carrying out certain aspects of the invention.
Figure 3:
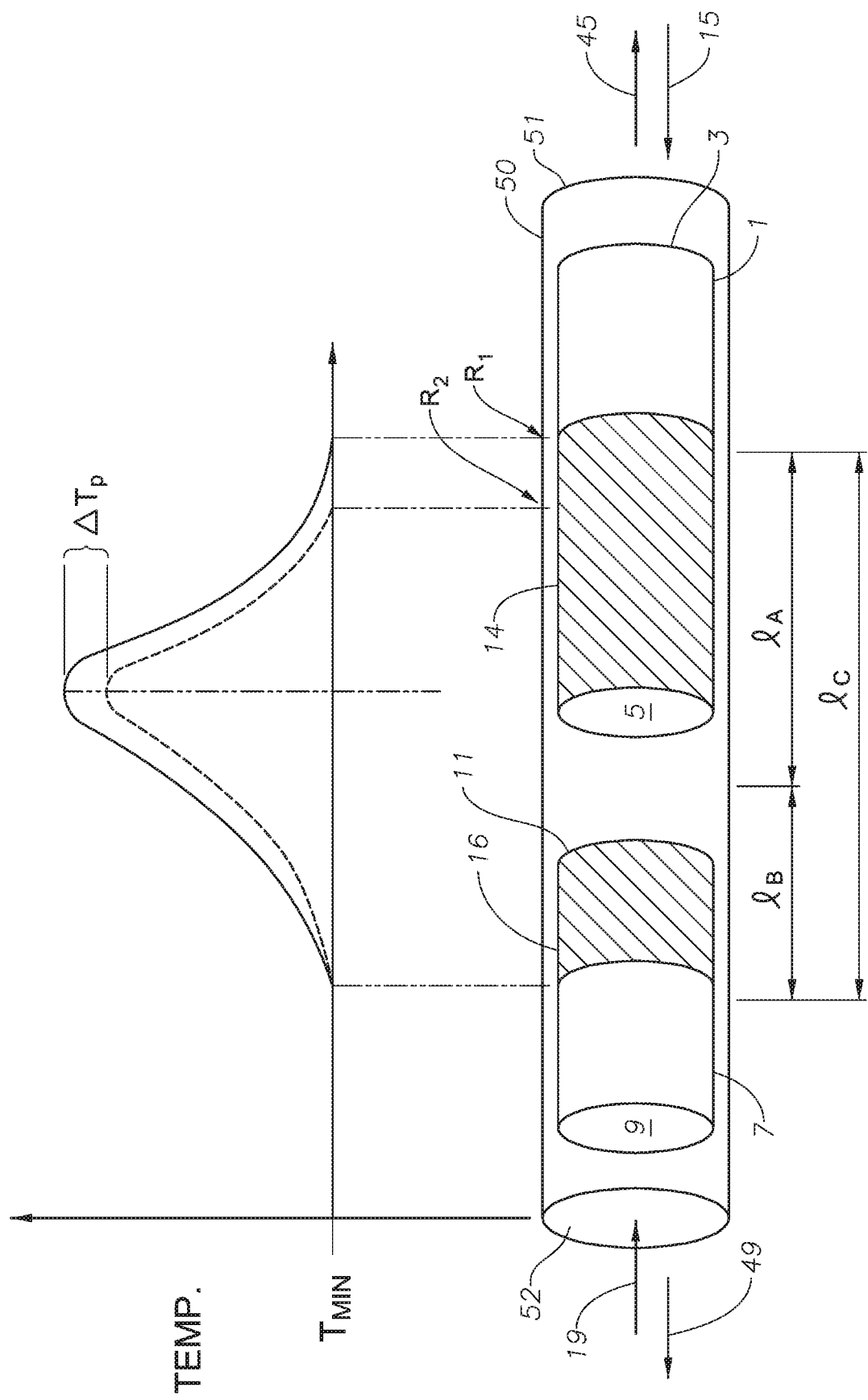
FIGS. 3 and 4 schematically show forms of a reverse flow reactor and representative bulk gas temperature profiles at the start (solid lines) and end (dashed lines) of pyrolysis.

Referring again to aspects illustrated in FIG. 2, a first segment of the first thermal mass 1 is located in the first heat transfer zone, with a second segment being located in the reaction region. Likewise, a first segment of the second thermal mass 7 can be located in the second heat transfer zone, with a second segment being located in the reaction region. Typically, thermal masses 1 and 7 have the form of an elongated tubular member comprising refractory and having at least one internal channel and opposed apertures in fluidic communication with the internal channel(s). Thermal mass 1 has a length $L_1$, and typically $L_1$ is substantially the same as the length of the internal channel, $L_1$. Thermal mass 7 has a length $L_3$, and typically $L_3$ is substantially the same as the length of the internal channel, $L_c$. $L_1$ (and also typically $L_3$) is ≥0.1*$L_R$, e.g., in the range of from 0.1*$L_R$ to 0.9*$L_R$ such as 0.1*$L_R$ to 0.4*$L_R$, where $L_R$ is the length of the reactor, e.g., the distance between faces 51 and 52. Optionally, $L_3$ is of substantially the same length as $L_1$, and is of substantially the same cross-sectional shape and of substantially the same cross sectional area. As shown in FIG. 2, thermal mass 1 includes first and second apertures 3 and 5, and thermal mass 7 includes first and second apertures 9 and 11. Aperture 3 is proximate to opening 51, and aperture 9 is proximate to opening 52. Optionally, particularly in aspects (not shown) in which thermal mass 7 is omitted, aperture 5 can be proximate to opening 52. Turning again to the aspects illustrated in FIG. 2, thermal masses 1 and 7 can each have the form of an elongated honeycomb comprising at least one channel, the channel having a plurality of passages. When a thermal mass is a segmented thermal mass, the honeycombs can be arranged adjacent to one another (e.g., end-to-end, in series). As may be appreciated, it is desirable. e.g., to lessen reactor pressure drop, to a align passages of a honeycomb's internal channel or channels with those of neighboring honeycombs to facilitate fluidic communication through the thermal mass. Optionally, the segments are of substantially the same composition, shape, cross sectional area, and have substantially the same total number of passages and the same number of passages per unit area.

The internal volume of reactor 50 includes a reaction zone located between first and second heat transfer zones. At least a segment of the first thermal mass is located in the first heat transfer zone, and at least a segment of the second thermal mass is located in the second heat transfer zone. Pyrolysis is carried out in the reaction zone during pyrolysis mode and combustion is carried out in the reaction zone during heating mode. The reaction region typically includes segments of the first and second thermal masses as are located toward apertures 5 and 11 and away from apertures 3 and 9. At the start of pyrolysis mode, the inward ends of the first heat and second transfer zones abut the pyrolysis zone at locations along reactor length $L_R$ which exhibits a bulk gas temperature greater than that needed to convert feed hydrocarbon to unsaturated products by pyrolysis under the selected pyrolysis conditions. The location where the first heat transfer zone abuts the pyrolysis zone typically moves inward along $L_R$ during $t_P$. The location where the second heat transfer zone abuts the pyrolysis zone during $t_P$ depends mainly on the pyrolysis conditions. This location can remain fixed during $t_P$, or can move inward or outward along $L_R$. Typically, although not always, apertures 5 and 11 are located in the pyrolysis zone during all of $t_P$.

During heating mode, the reaction zone encompasses a combustion zone, typically located between apertures 5 and 11. The combustion zone is the region of the reactor where oxidant and fuel provided from external sources react to produce heat. Unlike the boundaries of the pyrolysis zone during pyrolysis, the boundaries of the combustion zone abutting the first and second heat transfer zones typically remain fixed during $t_H$. Although combustion zone can occupy less than all of the region between apertures 5 and 11 of the first and second thermal masses, it is within the scope of the invention for the combustion zone to include all of the reactor's internal volume between apertures 5 and 11. e.g., the entire length L shown in FIG. 2. Typically, however, combustion zone is centered in the region between apertures 11 and 5, e.g., proximate to one or more mixer-distributors 10, with $L_2$ being substantially equal to $L_4$. As may be appreciated, the combustion zone occupies a region of reactor 50's internal volume during $t_H$ that is within the pyrolysis zone during $t_P$. However, since in the aspects illustrated in FIG. 2, a heating mode is not carried out at the same time as pyrolysis mode, appreciable combustion does not occur in the combustion zone during pyrolysis and appreciable pyrolysis does not occur in the pyrolysis zone during heating.

The combustion zone is typically configured for (i) mixing the fuel and a portion of the oxidant during heating mode for efficient combustion, (ii) increasing distribution uniformity over third zone's internal cross sectional area of the combustion products, unreacted oxidant, and optionally unreacted fuel, and (iii) lessening undesirable pressure-drop effects during pyrolysis mode. The combustion zone can have the form of an open volume within the internal volume of reactor 50, e.g., an open volume having a length L and substantially constant circular cross section of diameter D and cross sectional area A (not shown). As may be appreciated, an open volume having an appropriate L:A ratio will provide at least some mixing and distribution during heating mode without creating too great a pressure drop during pyrolysis mode. More typically, since it provides improved mixing and distribution and allows a lesser overall length for the combustion zone, the combustion zone includes at least one mixer-distributor apparatus 10. The mixer-distributor, which can have the form of a relatively thin member (e.g., a plate) having one or more orifices effective for carrying out the mixing and distribution during heating mode. Generally, the orifices have sufficient cross sectional area to prevent an undesirably large pressure drop across the third zone during pyrolysis mode. Conventional mixer-distributors can be used, such as those described in U.S. Patent Application Publication No. 2013-0157205 A1 and U.S. Pat. No. 7,815,873 (incorporated by reference herein in their entireties), but the invention is not limited thereto. Optionally, the combustion zone contains at least one selective combustion catalyst. Suitable selective combustion catalysts are described in U.S. Pat. No. 8,754,276, but the invention is not limited thereto. When used, a fixed bed of the selective combustion catalyst can be included as a component of the mixer-distributor, e.g., with one or more of the mixer-distributor's plate members serving as a catalyst support. When used, the mixer-distributor can be located at any location within the combustion zone. Typically, however, it is located approximately mid-way between apertures 11 and 5. In certain aspects, however, such as those where the amount of coke deposits in thermal mass 1 exceed that of thermal mass 7, the combustion zone is shifted downstream (with respect to fuel-oxidant flow) toward thermal mass 1. The amount of shift is typically ≤25% of L, e.g., ≤20%, such as ≤10%.

The sum of lengths $L_1$, L, and $L_3$ is typically ≥90% of the total length of reactor 50 ($L_R$), e.g., as measured between openings 51 and 52. Since it is desirable to direct fuel and oxidant flows into appropriate passages of thermal mass 7 during heating mode and to direct pyrolysis feed flow into appropriate passages of thermal mass 1 during pyrolysis mode, it is typically desired to limit the internal volume between aperture 9 and opening 52 and between aperture 3 and opening 51, to that needed for convenient reactor assembly and to prevent component interference as might otherwise occur from thermal expansion during use. Typically, aperture 9 is adjacent to opening 52 and aperture 3 is adjacent to opening 51. For, example, the distance along the flow path between aperture 9 and opening 52 is typically ≤0.1 $L_R$, such as ≤0.01 $L_R$, or ≤0.01 $L_R$. Likewise, the distance along the flow path between aperture 3 and opening 51 is typically ≤0.1 $L_R$, such as ≤0.01 $L_R$, or ≤0.01 $L_R$. The pyrolysis zone, which at the start of $t_P$ generally encompasses all of region L, a segment of $L_1$, and a segment of $L_3$, is typically ≥10% of the total length of reactor 50. e.g., ≥15%, such as ≥20%. It is also typical for the pyrolysis zone to encompass ≤80% of the total length of reactor 50, e.g., to leave sufficient internal volume of thermal mass 1 for pre-heating the pyrolysis feed and sufficient internal volume of thermal mass 7 for cooling (e.g., quenching) the pyrolysis product, e.g., ≤60%, such as ≤40%. In certain aspects, the pyrolysis zone at the start of $t_P$ has a length in the range of from 10% to 60% of the total length of the reactor, e.g., in the range of from 20% to 40%. The combustion zone's length L is typically ≤50% of that of the length of the pyrolysis zone, e.g., ≤40%, such as ≤30%, or ≤20%.

Values for L, $L_1$, $L_2$, $L_3$, $L_4$, and D generally depend on the pyrolysis feed used and the rate at which it is conducted into the reactor, the fuel and oxidant compositions, and the rate at which these are conducted into the reactor, etc. Although larger and small reactors are within the scope of the invention, (i) D is typically ≥1 cm, e.g., in the range of from about 1 cm to 10 in, such as 0.1 m to 7.5 m, (ii) $L_R$ is typically ≥1 cm, e.g., in the range of from about 1 cm to 20 m, such as 0.1 m to 7.5 m, (iii) L is typically ≤25% of $L_R$, e.g., ≤10%, (iv) $L_1$ is typically ≥35% of $L_R$ e.g., ≥45%, (v) $L_3$ is typically ≥35% of $L_R$, e.g., ≥45%, $L_3$ being optionally of substantially the same size and shape as $L_1$, and (vi) $L_2$ is typically within about +/−25% of $L_4$, e.g., +/−10%, such as +/−5%.

In aspects illustrated schematically in FIG. 2, reactor 50 is heated during heating mode by conveying a heating mixture 19 comprising fuel and oxidant through opening 52, through aperture 9 of thermal mass 7, and out of aperture 11 toward mixer-distributor 10. Typically, the fuel and oxidant are conveyed separately through different channels of thermal mass 7 from aperture 9 toward aperture 11, and are combined to form the heating mixture downstream (with respect to fuel/oxidant flow) of thermal mass 7. Typically fuel and oxidant are heated by a transfer of heat from thermal mass 7 as the fuel and oxidant flow through the channels of thermal mass 7. Combustion of the fuel and oxidant produces a combustion product. Combustion product, any un-combusted oxidant, and any un-combusted fuel enter aperture 5. When there is un-combusted oxidant in thermal mass 1, this can react with coke deposits and any un-combusted fuel to produce additional combustion product. An aggregated combustion product 45 is conducted out of aperture 3 and away from the reactor via opening 51. The aggregate combustion product typically comprises the combustion product produced in combustion zone 10; additional combustion product, typically from combustion of coke in passages of thermal mass 1; and any unreacted fuel and/or any unreacted oxidant. Reactor 50 is switched from heating mode to pyrolysis mode after achieving the desired reactor temperature profile and establishing the desired approach temperature for the start of pyrolysis mode, e.g., at a location proximate to aperture 3.

Continuing with reference to FIG. 2, a pyrolysis feed 15 is conducted into reactor 50 during pyrolysis mode via opening 51. The pyrolysis feed is preheated in an upstream segment of thermal mass 1 (the first heat transfer zone) and is pyrolysed in (i) a downstream segment of thermal mass 1, and optionally also in (ii) the region between thermal mass 1 and thermal mass 7 and (iii) in an upstream segment of thermal mass 7 (regions (i), (ii), and (iii) together encompassing the pyrolysis zone), wherein upstream and downstream are now defined with respect to the flow of feed and pyrolysis product. The pyrolysis product is cooled in the second heat transfer zone, e.g., a downstream segment of thermal mass 7 (the second heat transfer zone), which separates from the pyrolysis product a volatile portion and a non-volatile portion. The process gas is conducted away from thermal mass 7 via aperture 9, and is conducted away from reactor 50 via opening 52. The non-volatile portion of the pyrolysis product remains in the reactor, typically as coke deposits. Pyrolysis mode is carried out for a time $t_P$ under pyrolysis conditions sufficient to produce the desired pyrolyse products and to establish a desired approach temperature $\Delta T_a$ at a location proximate to aperture 9 at the start of heating mode.

Heating mode is carried out for a time interval of duration $t_H$ to (i) establish a desire approach temperature $\Delta T_a$ at a location proximate to aperture 3 at the start of $t_P$, (ii) achieve a desired temperature profile in the reaction region of reactor 50 at the start of $t_P$, primarily by fuel-oxidant combustion in combustion zone 10, coke-oxidant combustion in passages of thermal masses 1 and 7, and optionally additional fuel-oxidant combustion in internal passages of thermal mass 1 and (less typically) thermal mass 7. Following heating mode, pyrolysis mode is again carried out during $t_P$ under pyrolysis conditions sufficient to produce the desired pyrolysis products, (ii) establish a desired approach temperature $\Delta T_a$ at aperture 9 for the start of heating mode. Following this, reactor 50 is again switched from pyrolysis mode to heating mode to reheat the reactor, so that (i) the desired approach temperature $\Delta T_a$ is established at aperture 3 at the start of a following pyrolysis mode and (ii) the desired bulk gas temperature profile is exhibited at the start of a following pyrolysis mode. Typically, valve means (e.g., a plurality of valves), and at least one flow controller are provided to (i) establish forward flows of the pyrolysis feed and the pyrolysis product during $t_P$ and (ii) establish reverse flows of flow of the fuel, the oxidant, and the combustion product during $t_H$.

Pyrolysis mode and heating mode are typically repeated in sequence, for semi-continuous or continuous operation. Intervening steps between successive pyrolysis and heating modes, e.g., one or more steps for admitting a forward or reverse flow of sweep gas to the reverse-flow reactor, can be carried out between pyrolysis mode and heating mode operation, and vice versa Continuous or semi-continuous operation can be characterized by a "cycle time", which constitutes the time duration from the start of a pyrolysis mode to the start of the next pyrolysis mode in the sequence, and includes the time duration of heating mode(s) and any intervening steps (when used). Cycle time can be substantially constant over a plurality of repeated cycles, but this is not required. The invention is typically practiced with relatively short cycle times compared to that of conventional processes (e.g., steam cracking) for pyrolysing similar feed hydrocarbon at a peak pyrolysis temperature ≤1200° C. For example, cycle time can be ≤60 seconds, e.g., ≤30 seconds, such as ≤15 seconds, or ≤5 seconds. Typically, cycle time is in the range of from 2 seconds to 60 seconds, e.g., 3 second to 30 seconds, such as 4 second to 30 seconds. When (i) the pyrolysis feed is introduced into the reactor in a direction that is substantially opposite to the direction of fuel and oxidant flow and/or (ii) when the flow of pyrolysis product away from the reactor is substantially opposite to the direction of combustion product flow, the reactor is called a reverse-flow reactor.

Certain aspects of heating mode operation, during which reactor 50 is preheated for initial pyrolysis mode operation, or reheated for continued pyrolysis mode operation, will now be described in more detail. The invention is not limited to these aspects, and this description is not meant to foreclose other ways to operate a heating mode.

Representative Heating Mode Conditions

Operating conditions during heating mode are selected to (i) reheat the pyrolysis zone to establish a temperature profile in the reactor corresponding to the desired bulk gas temperature profile at the start of a following pyrolysis mode, (ii) establish the desired approach temperature $\Delta T_a$ at a location proximate to the reactor's feed inlet at the start of $t_P$, and (iii) remove sufficient coke deposits from within the reactor's internal volume, which would otherwise lead to an increase in reactor pressure drop.

Combustion is carried out during heating mode by reacting fuel and oxidant, e.g., fuel and oxidant contained in a heating mixture. The fuel and oxidant can be the same as those disclosed in U.S. Pat. No. 7,943,808. Optionally, the fuel is derived from, comprises, consists essentially of, or consists of one or more of hydrogen. CO, methane, methane containing streams, such as coal bed methane, biogas, associated gas, natural gas and mixtures or components thereof, etc. The fuel typically comprises one or more of molecular hydrogen, synthesis gas (mixtures of CO and $H_2$), and hydrocarbon, such as ≥10.0 wt. % hydrocarbon, or ≥50.0 wt. % hydrocarbon, or ≥90.0 wt. % hydrocarbon. The oxidant is typically one or more of molecular oxygen, ozone, and air, including molecular oxygen in air. Besides fuel and oxidant, other streams can be provided to the reactor during heating mode, e.g., one or more diluent streams can be provided, such as by addition to the heating mixture. When used, diluent can be provided with the oxidant and/or fuel. Suitable diluents (which can be a diluent mixture) include one or more of, e.g., oxygenate (water, carbon dioxide, etc.), non-combustible species, such as molecular nitrogen ($N_2$), and fuel impurities, such as hydrogen sulfide. For example, the oxidant can comprise 60.0 mole % to 95.0 mole % diluent and 5.0 mole % to 30.0 mole % molecular oxygen per mole of the oxidant, such as when the oxidant is air. Optionally, the oxidant has a mass ratio of diluent to molecular oxygen in the range of 0.5 to 20.0, e.g., in the range of 4.0 to 12.0.

Those skilled in the art will appreciate that heating mixture's flow rate will depend on factors such as feed composition, reactor volume, pyrolysis conditions, etc. Accordingly, the invention can be carried out over a very wide range of heating mixture flow rates. e.g., at a flow rate ≥0.001 kg/s, such as ≥0.1 kg/s, or ≥10 kg/s, or ≥100 kg/s, or more. The fuel and/or oxidant is typically provided to the reactor at sufficient temperature so that ≥50 wt. % of the fuel or oxidant as the case may be is in the vapor phase at approach temperature $\Delta T_a^2$, e.g., ≥75 wt. %, or ≥90 wt. %. Generally, the fuel and or oxidant are supplied to the reactor from a sources of these heating mixture components at a temperature in a range of from 25° C. to 600° C., e.g., 100° C. to 400° C.

Once a fuel of the desired caloric content (heating value) has been selected, the amounts of fuel and oxidant conducted to the reactor during heating mode can be specified in terms of the amount of oxidant needed for combusting the accumulated coke deposits ("$OC_a$") and the amount of oxidant ("$OC_b$") needed for the substantially stoichiometric combustion of the fuel. Typically, the amount of oxidant supplied during heating mode is $Z \cdot (OC_a + OC_b)$, wherein Z is generally ≥0.5, e.g., ≥0.8, such as in the range of 0.5 to 5.0, or 0.5 to 3.0, or 0.8 to 3.0. The amounts $OC_a$ and $OC_b$ are on a molar basis. When Z>1.0, the excess oxidant can be utilized. e.g., for one or more of removing at least a portion of any accumulated coke deposits, moderating the reaction temperature during heating mode (as disclosed in U.S. Pat. No. 7,943,808), and conveying heat within the reactor from one zone to another. Generally, a first portion of the oxidant is combusted with the fuel in the combustion zone, and a second portion is combusted with accumulated coke deposits. Typically, the first portion comprises ≥50 wt. % of the total amount of oxidant supplied during heating mode, e.g., ≥75 wt. %, or ≥90 wt. %, with the second portion comprising at least 75 wt. % of the remainder of the total oxidant, e.g., ≥90 wt. %. It is also typical for oxidant flow rate and fuel flow rate to remain substantially constant for the duration of heating mode. These flow rates are selected to achieve the desired amount of combustion heating and the desired amount of coke removal during $t_H$. The invention is compatible with conventional methods for lessening coke accumulation in thermal masses during heating mode, e.g., those described in U.S. Pat. No. 9,187,382, which is incorporated by reference in its entirety.

Certain aspects include carrying out heating mode using air as the oxidant. Referring again to FIG. 1A, air is conducted via line 201 to compressor 202 of turbo-compressor stage 200. Compressor 202 is powered by steam turbine 203. The compressed air is conducted to reactor 50 via line 19, heated in second heat transfer zone 103, and combusted with fuel (not shown) in combustion zone 105. A combustion effluent is produced by the combustion, and heat is transferred (typically from both the combustion itself and the combustion effluent) to reaction region 106 and first heat transfer zone 102. By carrying out combustion mode under the specified conditions for a time in the range specified for $t_H$, (i) the combustion effluent at the outlet of the reactor (e.g., first opening 51 of FIG. 2) has a bulk gas temperature ≤600° C. at the start of $t_H$, and (ii) a desirable first approach temperature $\Delta T_a^1$ is established at location X for the start of a subsequent pyrolysis mode. Typically, the combustion product has a bulk gas temperature of ≤500° C. proximate to the first opening at the start of $t_H$, such as ≤400° C., or in the range of from 25° C. to 600° C., or 50° C. to 500° C. Likewise, the process gas has a bulk gas temperature proximate to the second opening at the start of $t_P$ that is ≤550° C., such as ≤500° C., or ≤400° C., or in the range of from 25° C. to 600° C., or 50° C. to 550° C., or 450° C. to 550° C. If needed, the combustion effluent can be cooled against a first boiler feed water (BFW1) in a first heat exchanger (HE1), and is then conducted away. Heated BFW1 is conducted via line 504 to furnace 501 in steam generation stage 500 to produce superheated steam, which is conducted to steam turbine 203 via line 503. Heat for steam generation stage 500 can be provided via fired heater 502 which includes burners and a line for supplying burner fuel as shown. Any convenient burner fuel can be used, e.g., the fuel utilized in the heating mixture during heating mode. A second source of boiler feed water (BFW2) can be used if needed for cooling process gas 49 in a second heat exchanger (HE2) upstream of olefin recovery facility 450. Heated BFW2 is conducted to steam generator 500 via line 505 to produce additional superheated steam for line 503. In other aspects, HE1 and/or HE2 are not used, and additional furnace firing is used instead in steam generator 500 to covert sufficient boiler feed water to superheated steam for powering turbo-compressor stage 200.

So that turbo-compressor 200 is sufficiently powered during both pyrolysis and heating modes in aspects utilizing HE1 and/or HE2, at least a second reverse-flow thermal pyrolysis reactor (not shown) is typically operated in parallel. When the first reverse-flow thermal pyrolysis reactor is operated in combustion mode, the second reverse-flow thermal pyrolysis reactor is operated in pyrolysis mode, and vice versa. Accordingly, compressed air for the second reverse-flow thermal pyrolysis reactor is supplied as needed via line 19A, combustion effluent is conducted away via line 45A, pyrolysis feed is supplied as needed via line 15A, and pyrolysis product is conducted away via line 49A. Wet steam conducted away from turbine 203 via line 204 can be condensed and pumped (not shown) for recycle to BFW1 and BFW1. Additional reverse-flow thermal pyrolysis reactors (not shown) can added to the system if desired, e.g., with a third reverse-flow thermal pyrolysis reactor operating in "sweep mode", while the second reverse-flow thermal pyrolysis reactor operates in pyrolysis mode, and the reverse-flow thermal pyrolysis reactor operates in heating mode. The first, second, and third reverse-flow thermal pyrolysis reactors can be substantially similar, and can be operated under similar conditions to achieve approach temperatures in the desired ranges for pyrolysis mode and heating mode.

A feature of the invention is that operating pyrolysis mode under the specified conditions establishes a desirable second approach temperature $\Delta T_a^2$ at location Y at the start of $t_H$. Moreover, it has been surprisingly found when the reverse-flow thermal pyrolysis reactor (e.g., that of FIG. 2) is configured so that little if any pyrolysis occurs outside of pyrolysis zone $1_c$ (FIGS. 3 and 4, e.g., not in unshaded segments of thermal masses 1 and 7), the desired $\Delta T_a^2$ at location Y can be established for the start of $t_H$ without significantly decreasing yield of desired pyrolysis products such as ethylene during $t_P$. Typically, at the start of $t_H$ at location Y, $\Delta T_a^2$ is ≤125° C., e.g., ≤100° C., such as ≤75° C., or ≤50° C., or ≤30° C. For example, when the oxidant of line 19 is compressed air and location Y is proximate to aperture 9, e.g., $\Delta T_a^2$ at the start of $t_H$ is typically in the range of from 25° C. to 115° C., such as 30° C. to 100° C., or 40° C. to 90° C. Should the value of $\Delta T_a^2$ at location Y at the start of $t_H$ drift away from the desired value during the course of repeated cycles of pyrolysis mode and heating mode, the desired value can be restored, e.g., by one or more of (i) adjusting the temperature of compressed air in line 19. (ii) adjusting the duration of $t_P$, and (iii) adjusting the gas residence time in the pyrolysis zone during $t_P$. Establishing a first approach temperature $\Delta T_a^1$ in the desired range at location X at the start of $t_P$ and a second approach temperature $\Delta T_a^2$ at location Y at the start of $t_H$ typically lessens the need for heating reaction zone 106 during heating mode. This in turn decreases the amount of heat available for transfer to BFW1 in HE1 and to BFW2 in HE2. Although this decrease in heat transfer results in a need for additional heating in steam generator 500 to sustain the operation of compressor 202, an overall increase in the thermal efficiency of the system is achieved. While not wishing to be bound by any theory or model, it is believed that the thermal efficiency loss which results from $\Delta T_a^1$ and/or $\Delta T_a^2$ exceeding their specified ranges arises mainly from a need for additional combustion during heating mode to maintain the desired feed conversion during pyrolysis mode. In certain aspects, the amount of cooling of the combustion product within the first heat transfer zone (during combustion mode) and the amount of cooling of the process gas within the second heat transfer zone (during pyrolysis mode) are sufficient for system operation, albeit with some additional heating in steam generator 500. This in turn facilitates the elimination of one or more of HE1 and HE2, which reduces system capital costs and increases system reliability.

In order to (i) lessen or prevent the occurrence of a sharp temperature gradient in the bulk gas temperature profile during $t_P$ and (ii) to establish the desired approach temperature $\Delta T_a$ at a location proximate to the reactor's feed inlet at the start of $t_P$, it was expected that a relatively long-duration $t_H$ would be needed, e.g., $t_H$ ≥30 seconds, or ≥50 seconds. Surprisingly, this is not the case: a $t_H$≤27 seconds is typically sufficient for reheating the reactor to achieve the desired bulk gas temperature profile at the start of pyrolysis mode, e.g., ≤25 second, such as ≤10 seconds, or ≤1 second, or ≤0.1 second. For example, $t_H$ can be in the range of from 0.01 second to 25 seconds, or 0.05 second to 10 seconds, or 0.05 second to 5 seconds, or 0.05 second to 1 second.

It was also expected that fuel-oxidant combustion should be distributed through the reactor's pyrolysis zone to achieve the desired non-constant bulk gas temperature profile in the pyrolysis zone during $t_P$, and to lessen or prevent the occurrence of a sharp temperature gradient in the bulk gas temperature profile during $t_P$. Surprisingly, it has been found that this is not the case. The desired bulk gas temperature profile for pyrolysis mode is established during heating mode by carrying out fuel-oxidant combustion primarily in the central region of the reactor (e.g., a region of length L as shown in FIG. 2). While not wishing to be bound by any theory model, it is believed that concentrating combustion in the central region of the reactor leads to an improved reactor temperature profile compared to that which is achieved by distributed combustion for mainly two reasons. First, the greater fuel and oxidant flow rates needed to achieve the desired amount of combustion during $t_H$, and the resulting increased flow rate of combustion product, leads to more favorable distribution of combustion heat within the reactor. Second, during heating mode the combination of radiative heat transfer to a thermal mass proximate to the combustion zone and heat conduction within the thermal mass sufficiently moderates the reactor temperature profile so as to broaden temperature gradients in the pyrolysis zone (e.g., gradients along the length of the reactor) that would otherwise be undesirably sharp.

Referring again to FIG. 2, an appropriate combustion zone of length L can be achieved by conventional methods, e.g., by use of one or more mixer-distributors 10, use of a selective combustion catalyst, etc. For example, it has been found that even when mixer-distributors and selective combustion catalysts are not used, limiting Z to a value ≤5.0, e.g., ≤3.0, and especially <2.0, results in a combustion zone length L that is ≤50% of that of the length of the pyrolysis zone, e.g., ≤40%, such as ≤30%, or ≤20%.

After the reactor is sufficiently reheated to (i) establish the reactor temperature profile desired at the start of pyrolysis and (ii) establish the desired approach temperature $\Delta T_a$ at a location proximate to the reactor's feed inlet at the start of $t_P$, the reactor can be switched from heating mode to pyrolysis mode, typically by decreasing or terminating fuel and oxidant flow and commencing or increasing a flow of pyrolysis feed. Representative pyrolysis feeds will now be described in more detail. The invention is not limited to these pyrolysis feeds, and this description is not meant to foreclose the use of other pyrolysis feeds within the broader scope of the invention.

Representative Pyrolysis Feeds

The pyrolysis feed comprises $C_{2+}$ hydrocarbon, e.g., ≥1 wt. % of $C_{2+}$ hydrocarbon, such as ≥10 wt. %, or ≥25 wt. %, or ≥50 wt. %, or ≥75 wt. %, or ≥90 wt. %. Typically ≥90 wt. % of the remainder of the pyrolysis feed comprises diluent, e.g., one or more of methane. $CO_2$, water, etc. In certain aspects, the pyrolysis feed consists essentially of or even consists of $C_{2+}$ hydrocarbon, e.g., $C_2$-$C_9$ paraffinic hydrocarbon. The pyrolysis feed's hydrocarbon (the "feed hydrocarbon") generally includes any hydrocarbon compounds or mixture of hydrocarbon compounds that when subjected to the specified pyrolysis conditions produce the desired pyrolysis product. Suitable pyrolysis feeds include those disclosed in U.S. Patent Application Publication No. 2016-176781, which is incorporated by reference herein in its entirety. In certain aspects, particularly those aspects where the feed comprises ≥50 wt. % ethane (or propane, or a mixture of ethane and propane), e.g., ≥75 wt. %, such as ≥90 wt. %, conversion during pyrolysis is based on the amount of $C_{2+}$ hydrocarbon that is converted. In other aspects, e.g., those where the feed includes components such as (i) saturated $C_{4+}$ hydrocarbon and/or (ii) aromatic and/or non-aromatic cores having one or more substantially-saturated $C_{2+}$ side chains, the conversion is based on the aggregate amount of $C_{2+}$ hydrocarbon components converted, including such substantially saturated side chains as may be converted.

Although the feed hydrocarbon typically includes $C_{2+}$ compounds which contain hydrogen and carbon only, feed hydrocarbon can contain compounds having covalently-bound and/or non-covalently-bound heteroatoms. When present in the feed hydrocarbon, the amount of such heteroatom-containing hydrocarbon compounds is typically ≤10 wt. % based on the weight of the feed's hydrocarbon. Feed hydrocarbon that is substantially-free of non-aliphatic hydrocarbon is within the scope of the invention, as is feed hydrocarbon that is substantially free of aromatic hydrocarbon and/or substantially free of olefinic hydrocarbon, particularly $C_2$-$C_5$ olefin. Substantially-free in this context means <1 wt. % based on the weight of the feed hydrocarbon, such as ≤0.1 wt. %, or ≤0.01 wt. %, or ≤0.001 wt. %.

The feed hydrocarbon can be obtained from one or more sources of hydrocarbon, e.g., from natural hydrocarbon sources including those associated with producing petroleum, or from one or more synthetic hydrocarbons sources such as catalytic and/or non-catalytic reactions. Examples of such reactions include catalytic cracking, catalytic reforming, coking, steam cracking, etc. Synthetic hydrocarbon sources include those in which hydrocarbon within a geological formation has been purposefully subjected to one or more chemical transformations. The feed can include a recycled portion of the pyrolysis product, e.g., methane, molecular hydrogen, and $C_{2+}$ hydrocarbon, typically $C_2$ to $C_5$ paraffin.

The feed hydrocarbon can include one or more of ethane, propane, butanes, saturated and unsaturated $C_6$ hydrocarbon, including those derived from one or more of Fischer-Tropsch synthesis products, shale gas, biogas, associated gas, natural gas and mixtures or components thereof, steam cracked gas oil and residues, gas oils, heating oil, jet fuel, diesel, kerosene, gasoline, naphtha (including coker naphtha, steam cracked naphtha, and catalytically cracked naphtha), hydrocrackate, reformate, raffinate reformate. Fischer-Tropsch liquids, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum. $C_4$—residue admixture, naphtha—residue admixture, cracked feed, coker distillate streams, and hydrocarbon streams derived from plant or animal matter. The feed hydrocarbon can comprise volatile and non-volatile hydrocarbon, as described in U.S. Patent Application Publication No. 2016-176781. Those skilled in the art will appreciate that feed flow rate will depend on factors such as feed composition, reactor volume, pyrolysis conditions, etc. Accordingly, the invention can be carried out over a very wide range of feed flow rates, e.g., at a flow rate ≥0.001 kg/s, such as ≥0.1 kg/s, or ≥10 kg/s, or ≥100 kg/s, or more.

Although the invention is not limited thereto, the specified process can be used for upgrading relatively refractory light (e.g., $C_2$-$C_5$) paraffinic hydrocarbon, such as ethane. Accordingly, the feed hydrocarbon can comprise ethane in an amount ≥1 wt. %, e.g., ≥5 wt. %, such as ≥10 wt. %. Suitable feeds include those comprising >50 wt. % ethane, such as ≥75 wt. %, or ≥90 wt. %, or ≥95 wt. %. For example, the feed can comprise an amount of ethane in the range of from 1 wt. % to 99 wt. %, such as 5 wt. % to 95 wt. %, or 10 wt. % to 90 wt. %. One representative feed hydrocarbon comprises (i) ≥10 wt. % ethane, or ≥50 wt. %, or ≥90 wt. %, such as in the range of from 10 wt. % to 99.5 wt. % ethane, with ≥95 wt. % of the balance of the feed hydrocarbon comprising one or more of methane, propane, and butanes. In other aspects, the feed comprises ≥90 wt. % of (i) ethane and/or (ii) propane. The light paraffinic hydrocarbon can be provided from any convenient source. e.g., from synthetic and/or natural sources. Light paraffinic hydrocarbon such as ethane can be provided from petroleum or petrochemical processes and/or sources of geological origin, e.g., natural gas. In particular aspects, the pyrolysis feed comprises ≥90 wt. % of (i) ethane and/or (ii) propane.

The pyrolysis feed optionally includes diluent, typically comprising compositions that are essentially non-reactive under the specified pyrolysis conditions, such as one or more of methane, water (e.g., steam), hydrogen, nitrogen and the noble gases, such as helium, neon and argon. Diluent present in the pyrolysis feed's source (e.g., methane and/or $CO_2$ present in natural gas) and diluent added to the pyrolysis feed are within the scope of the invention. Diluent, when present, is typically included in the pyrolysis feed in an amount ≤60 wt. % based on the weight of the feed, e.g., ≤50 wt. %, such as ≤40 wt. %, or ≤30 wt. %, or ≤20 wt. %, or ≤10 wt. %. Diluent is also suitable for use as a sweep gas, e.g., for (i) removing at least a portion of any deposits in the reactor after the pyrolysis mode and/or after heating mode and/or (ii) adjusting the reactor's temperature profile-heat carried by the sweep gas from warmer regions of the reactor for transfer to cooler regions will increase the temperature of the cooler regions and further lessen or prevent sharp gradients in the reactor temperature profile.

The pyrolysis feed is typically provided to the reactor at sufficient temperature so that ≥50 wt. % of the feed is in the vapor phase at approach temperature $\Delta T_a^1$, e.g., ≥75 wt. %, or ≥90 wt. %. Generally, the pyrolysis feed is supplied to the reactor from a feed source at a temperature in a range of from 25° C. to 600° C., e.g., 300° C. to 500° C. Typically ≤90 wt. % of the feed is liquid and/or solid at a temperature of about 566° C. and a pressure of about 1 bar absolute, and (ii) $T_{MIN}$ is ≥900° C., e.g., ≥1000° C.

A flow of the pyrolysis feed is conducted to the pyrolysis reactor during pyrolysis mode, typically in a reverse-flow direction, e.g., one that is opposed to that of oxidant flow. Certain pyrolysis conditions that are useful for pyrolysing the specified pyrolysis feeds will now be described in more detail. The invention is not limited to these pyrolysis conditions, and this description is not meant to foreclose the use of other pyrolysis conditions within the broader scope of the invention.

Representative Pyrolysis Mode Conditions

Pyrolysis mode is operated for a time duration $t_P$ during which the reactor's pyrolysis zone exhibits a bulk gas temperature profile that results in a range of light olefin yields, typically without excessive coke yield. At the start of pyrolysis mode, the reactor includes a preheated first heat transfer zone, a preheated reaction zone, and a pre-cooled second heat transfer zone. Any convenient method can be used for the pre-heating and pre-cooling, including carrying out heating mode before pyrolysis mode. When heating mode is carried out under the specified conditions. (i) desired approach temperature $\Delta T_a$ is established at a location proximate to the reactor's feed inlet at the start of $t_P$, and (ii) the bulk gas temperature profile at the start of pyrolysis mode continuously varies over the length of the pyrolysis zone. Although the peak gas temperature in the pyrolysis zone typically decreases during the course of the pyrolysis (as does $\Delta T_a$), the position of $T_P$ along the length of the pyrolysis zone and the general shape of the bulk gas temperature profile (within the pyrolysis zone) typically remain substantially the same during $t_P$. One way to maintain these locations substantially constant is by regulating the duration of $t_P$. Regions of substantially-constant temperature along the length of the pyrolysis zone are therefore avoided. Sharp gradients in the bulk gas temperature profile within the pyrolysis zone are also substantially avoided. Although the pyrolysis can be carried out at high severity, typically it is carried out at low severity. Outside of the pyrolysis zone, the bulk gas temperature profile at the start of $t_P$ is typically not congruent with that at the start of $t_P$. In certain aspects, the bulk gas temperature at a plurality of locations within the second heat transfer zone at the end of $t_P$ can exceed the bulk gas temperature at those locations at the start of $t_P$, mainly as a result of heat transfer from upstream to downstream toward the second heat transfer zone during the pyrolysis.

In order to (i) substantially maintain the shape of the bulk gas temperature profile (within the pyrolysis zone) as the peak gas temperature decreases during pyrolysis mode and (ii) provide the desired approach temperature $\Delta T_a$ at a location proximate to the reactor's oxidant inlet at the start of $t_H$, the duration of pyrolysis mode $t_P$ is kept relatively short as compared to conventional reverse-flow pyrolysis reactors pyrolysing substantially similar pyrolysis feeds, particularly at a $T_{av}$≤1400° C., e.g., ≤1200° C. In certain aspects, the duration of pyrolysis mode $t_P$ is ≤20 seconds, e.g., ≤15 second, such as ≤10 seconds, or ≤1 second, or ≤0.1 second, or ≤0.01 second. For example, $t_P$ can be in the range of from $1 \times 10^{-3}$ second to 20 seconds, e.g., 0.01 second to 15 seconds, such as 0.05 second to 5 seconds, or 0.05 second to 1 second, or 0.05 second to 0.5 second. Conventional methods can be used to achieve these ranges of $t_P$, e.g., using one or more poppet valves and/or hydrodynamic valving, but the invention is not limited thereto. Using the specified values avoids the appearance of pyrolysis zone segments having a substantially-constant bulk gas temperature profile. Using these $t_P$ values also substantially prevents relatively sharp temperature gradients in the pyrolysis zone. For example, at any time during the pyrolysis variations in the bulk gas temperature are typically ≤140° C. within any pyrolysis zone segment having a length ≤10% of $l_C$, e.g., ≤100° C., such as ≤50° C. More particularly, using these $t_P$ values typically limits temperature variations to ≤75° C. within any segment of thermal mass 1 that has a length ≤10% of $l_B$, e.g., ≤50° C., such as ≤25° C.

FIG. 3 schematically shows a representative regenerative reverse-flow reactor, similar to that shown in FIG. 2, and representative gas temperature profiles during pyrolysis. The solid line represents the bulk gas temperature profile at the start of $t_P$, and the dashed line represents the bulk gas temperature profile at the end of $t_P$. At the start of $t_P$, the flow of combustion mixture 19 is curtailed a flow of pyrolysis feed 15 is established. The reactor's pyrolysis zone at the start of $t_P$ encompasses the region between apertures 5 and 11, the shaded region 16 of thermal mass 7, and the shaded region 14 of thermal mass 1. Particularly at relatively large flow rates of fuel and/or oxidant during heating mode, and/or when $t_H$ is of relatively long duration, the peak gas temperature $T_p$ during $t_P$ can be displaced away from the aperture 11, toward aperture 5 or beyond. In such aspects, the length of the pyrolysis zone's downstream segment $l_B$ is less than that of the upstream segment $l_A$, e.g., at least 10% less, such as at least 25% less, or at least 50% less. The total length of the pyrolysis zone $l_C$ is the sum of $l_A$ and $l_B$. Typically, $l_C$ is in the range of from 10% to 50% of the total length of reactor 50, e.g., in the range of 20% to 40%. For example, $l_C$ can be in the range of from 20% to 40% of $L_1+L_2+L_3+L_4$ (FIG. 2). The locations of the terminal ends of $l_A$ and $l_B$ (the locations where the first and second heat transfer zones abut the pyrolysis zone during pyrolysis mode) are determined by the minimum temperature $T_{MIN}$.

Figure 4:
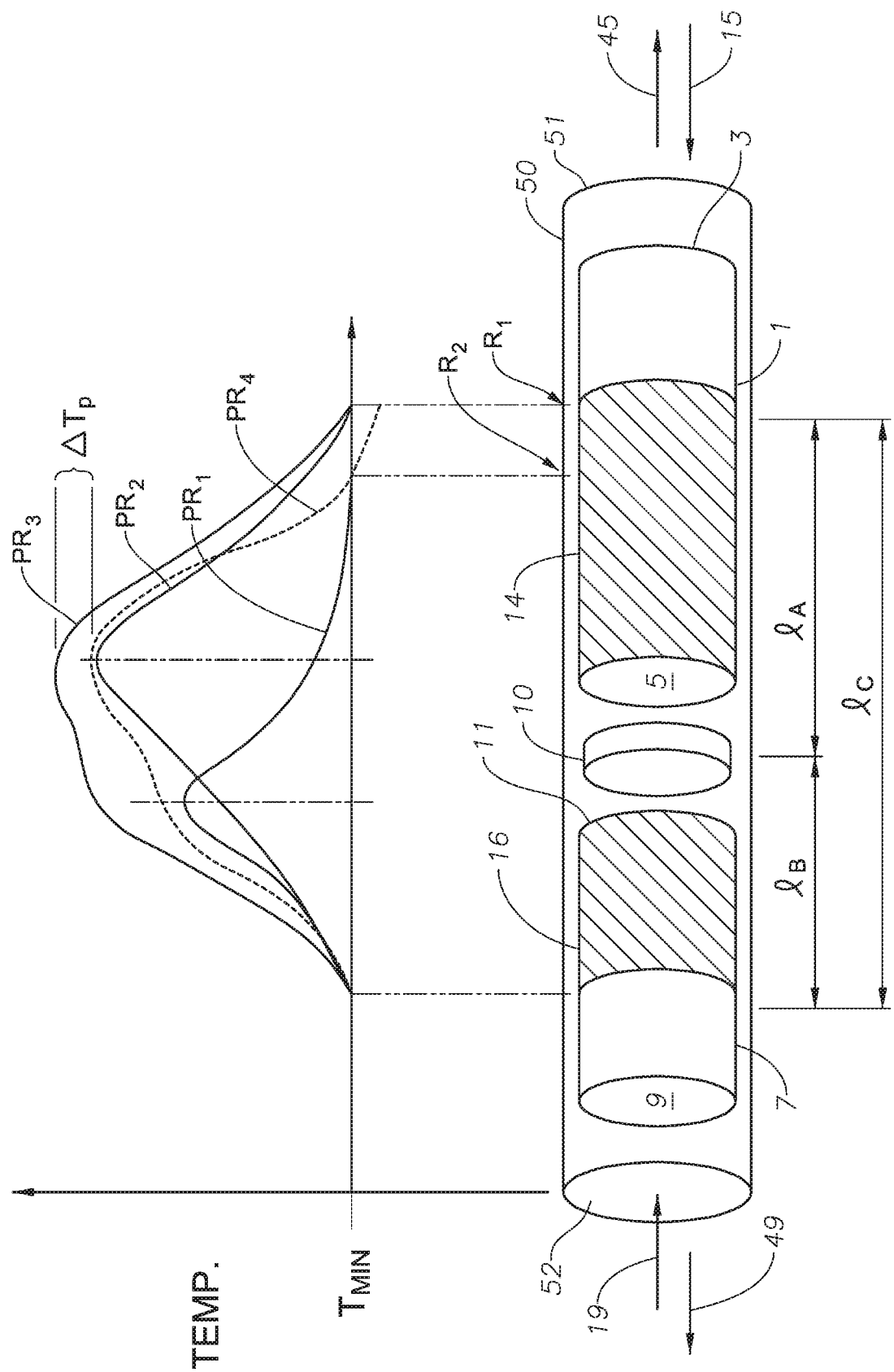

FIG. 3 shows aspects where $T_p$ is located within shaded region 14 of thermal mass 1. Other aspects of the invention are schematically illustrated in FIG. 4. In FIGS. 2-4, components and streams performing similar functions have the same index number. In these aspects, a mixer-distributor 10 is located within the combustion zone. In such aspects, the bulk gas temperature profile at the start of pyrolysis mode (profile $PR_3$) exhibits at least two local maxima, as does profile $PR_4$ which represents the bulk gas temperature profile at the end $t_P$. While not wishing to be bound by any theory or model, it is believed that the bi-modal bulk gas temperature profile results from heat radiated from the mixer distributor during heating mode toward thermal masses 1 and 7. Since the end of the mixer-distributer opposite aperture 5 achieves a greater temperature than the end facing aperture 11 during heating mode, and since radiative heating is a relatively short-range phenomena (the inverse-square law applies), thermal mass 1 is heated more than thermal mass 7. The resultant bulk gas temperature profile PR$_3$ at the start of pyrolysis mode is therefore believed to be a substantially linear combination of bulk gas temperature profile PR$_1$, which is related to the heating of thermal mass 7, and bulk gas temperature profile PR$_2$, which is related to the heating of thermal mass 1. Greater fuel-oxidant flow rates during heating mode lead to additional heating of thermal mass 1, e.g., by convective heat transfer from the combustion product, which displaces the peak temperature of profile PR$_2$ toward (or even into) shaded region 14. The maximum gas temperature of profile PR$_1$ is typically 20% to 70% of the maximum gas temperature of profile PR$_2$, such as 30% to 70%.

In aspects such as those illustrated in FIGS. 3 and 4, the pyrolysis conditions include a bulk gas temperature profile during pyrolysis (i.e., the profile of the pyrolysis bulk gas temperature) which at the start of $t_P$ typically increases, e.g., substantially monotonically, from a first temperature ($T_1$) proximate to aperture 3 of thermal mass 1 to temperature $T_{MIN}$ proximate to a location (the reference location) where the first heat transfer zone abuts the pyrolysis zone, e.g., reference location $R_1$ at the start of $t_P$ and reference location $R_2$ at the end of $t_P$. The peak gas temperature $T_p$ is greater than $T_{MIN}$ at the start of $t_P$, and is $\geq T_{MIN}$ at the end of $t_P$. $T_p$-$T_{MIN}$ at the start of pyrolysis is typically in the range of from 10° C. to 400° C., or 25° C. to 300° C., or 50° C. to 200° C. $T_{av}$ is $\geq T_{MIN}$+10° C. at the start of $t_P$. For example, $T_{av}$-$T_{MIN}$ at the start of pyrolysis is typically in the range of from 5° C. to 200° C., or 10° C. to 150° C., or in a range of from 20° C. to 100° C., or from 25° C. to 75° C. Typically, the position of $T_p$ within the pyrolysis zone remains substantially constant during the pyrolysis. Substantially constant in this context means that the location of $T_p$ changes during pyrolysis mode from its initial position by $\leq$+/−20% of $l_c$, e.g., $\leq$+/−15%, such as $\leq$+/−10%, or typically $\leq$+/−5%. Unlike $T_p$, the reference location typically varies in position during $t_P$. $T_1$ is typically less than $T_{MIN}$ during $t_P$, in other words, at least a segment of first thermal mass 1 is included in the first heat transfer zone. The value of $T_{MIN}$ depends on several factors, e.g., the choice of feed and pyrolysis process conditions such as pressure and residence time. For feeds comprising light hydrocarbon, e.g., one or more $C_2$-$C_5$ paraffin, $T_{MIN}$ at the start of $t_P$ is typically $\leq$1400° C. e.g., $\leq$1300° C., such as $\leq$1200° C., or $\leq$1100° C., or $\leq$1000° C. For example, at the start of $t_P$, $T_{MIN}$ is typically in the range of from 975° C. to 1100° C., and $T_p$ $\geq$1150° C. $T_{MIN}$-$T_1$ at the start of pyrolysis is typically in the range of from 10° C. to 400° C., or 25° C. to 300° C., or 50° C. to 200° C. In particular aspects utilizing a feed comprising ethane and/or propane, the pyrolysis conditions at the start of $t_P$ include $T_1 \leq$900° C., e.g., $\leq$750° C. such as $\leq$500° C., or $\leq$400° C., or in the range of 350° C. to 800° C.

At the start of $t_P$, the conversion of the feed's $C_2$-$C_5$ paraffinic hydrocarbon typically exhibits a profile (not shown in FIGS. 3 and 4) which increases from a first conversion ($X_1$) at a reference location $R_1$ positioned between the first and second apertures to a second conversion ($X_2$) proximate to aperture 5, wherein $X_1$ is in the range of from 25% to 85%, and $X_2$ is in the range of from 65% to 98%. Reference location $R_1$ is typically proximate to the location where the terminal end of the pyrolysis zone abuts the first heat transfer zone at the start of $t_P$. $T_p$ and $T_{av}$ both decrease during $t_P$, but the bulk gas temperature profile typically maintains substantially the same shape as shown. Although the bulk gas temperature profile (within the pyrolysis zone) at the start of $t_P$ is typically substantially congruent with that at the end of $t_P$, the location in the pyrolysis zone at which conversion $X_1$ is achieved translates during $t_P$ from $R_1$ toward aperture 5 to reference position $R_2$ at the end of $t_P$. In particular aspects where the feed comprises ethane and/or propane, the process can include one or more of (i) $X_1$ in the range of from 25% to 60%, (ii) the bulk gas temperature proximate to aperture 5 is in the range of from 1025° C. to 1075° C., (iii) $X_2$ in the range of from 85% to 98%. (iv) $T_{MIN}$ in the range of from 900° C. to 1000° C., and (v) the reference location $R_1$ is positioned within 0.2*$L_1$ and 0.4*$L_1$ of aperture 5. More particularly, conditions at the start of the pyrolysis can include (i) an acetylene selectivity in a range of from 0% to 1% at the reference location, which acetylene selectivity increases, e.g., monotonically, to a range of 5% to 10% at the second aperture, (ii) an ethylene selectivity in a range of from 85% to 95% at the reference location, which ethylene selectivity decreases, e.g., monotonically, to a range of 70% to 85% at the second aperture, (iii) a propylene selectivity in a range of from 0.7% to 0.9% at the reference location, which propylene selectivity varies monotonically or non-monotonically to a range of 0.4% to 0.6% at the second aperture, and (iv) a butadiene selectivity in a range of from 0.5% to 1.5% at the reference location, which butadiene selectivity increases, e.g., monotonically, to a range of 4% to 5% at the second aperture.

It has also been observed that utilizing a first thermal mass having an OFA in the specified range results in (i) establishing $\Delta T_a^2 \leq$125° C., e.g., $\leq$100° C., such as $\leq$75° C., or $\leq$50° C., or $\leq$30° C. at the start of $t_H$, and (ii) a decrease in $T_p$ and/or $T_{av}$ that is $\leq$100° C. during the course of the pyrolysis for commercially practical values of $t_P$, e.g., $\geq$1 second, and for a wide range of feeds and pyrolysis conditions. The pyrolysis conditions in the pyrolysis zone during $t_P$ generally include $T_p \leq$1400° C., $T_{av} \leq$1200° C., and an average total pressure $\geq$0 psig. Total gas residence time in the pyrolysis zone is generally $\leq$0.4 seconds to decrease the conversion to coke of desired products such as light olefin. Typically, the pyrolysis conditions at the start of $t_P$ include $T_p \leq$1200° C., e.g., $\leq$1100° C., such as $\leq$1000° C., or $\geq$800° C., or $\geq$900° C. or $\geq$1000° C., or in the range of from 1000° C. to 1400° C.; $T_{av} \leq$1100° C., e.g., $\leq$1000° C., such as $\leq$900° C., or in the range of from 900° C. to 1100° C., or 925° C. to 1075° C. and a feed hydrocarbon partial pressure $\geq$7 psia (48 kPa), or $\geq$10 psia (69 kPa), or $\geq$20 psia (138 kPa), or $\geq$30 psia (207 kPa). The average total pressure is typically $\geq$5 psig (34 kPag), or $\geq$15 psig (103 kPag), or $\geq$40 psig (276 kPag), or $\geq$80 psig (552 kPag), or $\geq$120 psig (827 kPag). Particularly when the pyrolysis feed includes diluent, the average total pressure at the start of $t_P$ can be $\geq$150 psig (1034 kPag), or $\geq$300 psig (2068 kPag), or $\geq$500 psig (3447 kPag). Total gas residence time in the pyrolysis zone is typically $\leq$0.2 second; preferably $\leq$0.15 second or $\leq$0.1 second; $\geq$0.01 second, or $\geq$0.05 second, or $\geq$0.1 second; or in the range of 0.001 second to 0.1 second, or in the range of 0.01 second to 1.0 second, or in the range of 0.01 second to 0.2 second. For example, the pyrolysis feed can be passed through thermal mass 1 at a total gas residence time at a bulk gas temperature $\geq$800° C. that is $\leq$0.100 second, such as ≤0.060 second, such as ≤0.040 second, or in the range of 0.001 second to 0.100 second, or in the range of 0.002 second to 0.060 second, or in the range of 0.002 second to 0.040 second. When utilizing a first thermal mass having an OFA in the specified range, these conditions have been observed to decrease $T_p$ and/or $T_{av}$ during $t_P$ by ≤100° C., e.g., ≤75° C., such as ≤50° C., or ≤25° C., or ≤10° C., or ≤5° C., for a $t_P$ ≥1 second, e.g., ≥2 seconds, such as ≥5 seconds, or ≥10 seconds, or ≥20 seconds, or ≥30 seconds, or even ≥1 minute or more.

Smaller values of OFA, which lead to a smaller decrease in the temperatures $T_p$ and $T_{av}$ during $t_P$, are typically desired at relatively large values of $T_p$, e.g., ≥1000° C., such as ≥1200° C., or ≥1300° C. Utilizing smaller variations in $T_p$ and $T_{av}$ during $t_P$ at relatively high pyrolysis temperatures has been found to moderate variations in the yield of less desirable pyrolysis products such as acetylene and coke as would otherwise occur during a commercially-reasonable $t_P$ (e.g., ≥2 seconds). This in turn leads to a simplification of olefin purification and recovery facilities. For example, when $T_{av}$ exceeds 900° C., it is beneficial for the thermal mass to have an OFA of ≤45%. When $T_{av}$ exceeds 1000° C., it is beneficial for the thermal mass to have an OFA of ≤35%, and when $T_{av}$ exceeds 1100° C., it is beneficial for the thermal mass to have an OFA of ≤25%. Stated another way, when $T_P$ exceeds 1000° C., it is beneficial for the change in $T_p$ and/or $T_{av}$ during $t_P$ ("$\Delta T_p$", and "$\Delta T_{av}$") to be ≤50° C., when $T_P$ exceeds 1100° C., it is beneficial for $\Delta T_p$ and/or $\Delta T_{av}$ to be ≤40° C., and when $T_P$ exceeds 1200° C., it is beneficial for $\Delta T_p$ and/or $\Delta T_{av}$ to be ≤20° C.

Modulating the pyrolysis bulk gas temperature as specified over the length of the pyrolysis zone during pyrolysis mode results in at least two desirable features: First, the pyrolysis establishes a desirable approach temperature $\Delta T_a^2$ at position Y (FIG. 1) for carrying out heating mode during $t_H$. Second, the pyrolysis product conducted away from the reactor comprises a range of desired hydrocarbon products.

A feature of the invention is that operating heating mode under the specified conditions establishes a desirable approach temperature $\Delta T_a^1$ at location X at the start of $t_P$. Moreover, it has been surprisingly found when the reverse-flow thermal pyrolysis reactor (e.g., that of FIG. 2) is configured so that little if any combustion occurs outside of combustion zone $1_c$ (FIGS. 3 and 4), e.g., not outside of reaction region 106 (FIG. 1B), the desired $\Delta T_a^1$ at location X can be established for the start of $t_P$ without significantly decreasing the thermal efficiency of reactor re-heating. Typically, at the start of $t_P$, $\Delta T_a^1$ is ≤50° C., e.g., ≤45° C., such as ≤40° C., or ≤35° C., or ≤25° C. For example, when feed of line 19 is ethane and/or propane, and location X is proximate to aperture 3, e.g., $\Delta T_a^1$ at the start of $t_P$ is typically in the range of from 5° C. to 45° C., such as 10° C. to 42° C., or 20° C. to 40° C. Should the value of $\Delta T_a^1$ at location X at the start of $t_P$ drift away from the desired value during the course of repeated cycles of pyrolysis mode and heating mode, the desired value can be restored. e.g., by adjusting one or more of (i) the temperature of feed in line 15, (ii) the duration of $t_H$, and (iii) the flow rate of oxidant supplied to the combustion zone during $t_H$.

Referring again to FIG. 1B, one or more of the desired hydrocarbon compounds is separated from the pyrolysis product, e.g., for storage and/or further processing. For example, one or more of ethylene, propylene, butadiene butenes, etc. can be separated from the pyrolysis product in recovery facility 450, e.g., for recovery and use in producing products such as fuels and fuel additives, oxygenates, polymer, etc. Molecular hydrogen and methane can be separated and recovered from the pyrolysis product, e.g., as a tail gas. Light paraffinic hydrocarbon can be separated recovered, e.g., for use as a fuel, such as a fuel for heating mode. Aromatic hydrocarbon, such as one or more of benzene, toluene, and xylenes, can be separated and recovered, e.g., for producing chemical and petrochemical products including fuel, solvents, polymer, etc. The recovery facility can include conventional separations and recovery technology, e.g., those described in U.S. Patent Application Publication No. 2016-176781, but the invention is not limited thereto.

In certain aspects, the recovery facility includes one or more compression stages for compressing the process gas. In the aspects illustrated schematically in FIG. 1B, for example, gas turbine generator 300 supplies power to compressor stages 410 and 420 in recovery facility 450. Process gas is conducted via line 49 to cooling stage 380 (typically a quench tower or combined quench tower-primary fractionator), and then conducted away via line 61. Water is a typical quench medium, which can be recovered via line 39, pressurized in pump 390, conducted to cooler 400 via line 40, and returned to the cooling stage via line 41. Cooled process gas is initially pressurized in compressor stages 410, which typically include at least three stages of increasing compression and inter-stage cooling. Pressurized process gas from the compressor stages 410 is conducted via line 42 to process gas upgrading equipment, typically caustic and/or amine treatment, shown schematically as tower 420. Spent treatment medium (e.g., spent caustic) is conducted away via line 60. Upgraded process gas is conducted via line 62 to second compression stages 430 for further pressurization. Typically, stages 410 and 430 are joined by rotating shaft 402, which may be joined to rotating shaft 401 for powering these stages. Shaft 402 obtains at least a portion of its shaft power from shafts 201 and 301 as shown by the broken line interconnecting these shafts. This can be accomplished by (i) a direct transfer of rotational energy, e.g., via a rotational power transmission; (ii) an indirect transfer, e.g., by powering an electric generator with shaft 201 and/or 301, driving an electric motor with at least a portion of the electric power produced by the generator, and using the motor to power shaft 401; and (iii) a combination of direct and indirect power transmission. Compressed process gas is conducted away via line 63 for storage and/or further processing, e.g., drying, acetylene conversion, and recovery of products such as ethylene. Certain representative pyrolysis products will now be described in more detail. The invention is not limited to these products, and this description is not meant to foreclose the production of other pyrolysis products within the broader scope of the invention.

Representative Pyrolysis Products

In certain aspects, the process gas conducted away from the reactor contains little if any liquid-phase or solid-phase material, and comprises molecular hydrogen; methane; ethane; ethylene; and typically one or more of propane; propylene; butanes; butenes; butadiene; $C_5$ hydrocarbon, including normal, iso, and cyclo $C_5$ olefin and paraffin, and $C_{6+}$ hydrocarbon, including aromatics and normal, iso, and cyclo $C_{6+}$ olefin and paraffin. For example, when utilizing one representative pyrolysis feed comprising light paraffinic hydrocarbon and representative heating mode and pyrolysis mode conditions, the pyrolysis product can comprise 2 wt. % to 10 wt. % methane, 50 wt. % to 95 wt. % ethylene, 0.2 wt. % to 1 wt. % propylene, 0.1 wt. % to 5 wt. % butadiene, and up to about 3 wt. % benzene, based on the weight of the pyrolysis product. As may be appreciated, these very desirable compositional ranges for the identified hydrocarbon compounds are achieved not only at the start of pyrolysis mode, but during the duration of $t_P$. This stands in sharp contrast to conventional processes operating at a gas temperature ≤1200° C., such as steam cracking. Since the conventional processes operate with little temperature variation in the pyrolysis zone, they produce a pyrolysis product having very narrow compositional ranges for the desired hydrocarbon compounds.

EXAMPLES

Example 1

Figure 1B:
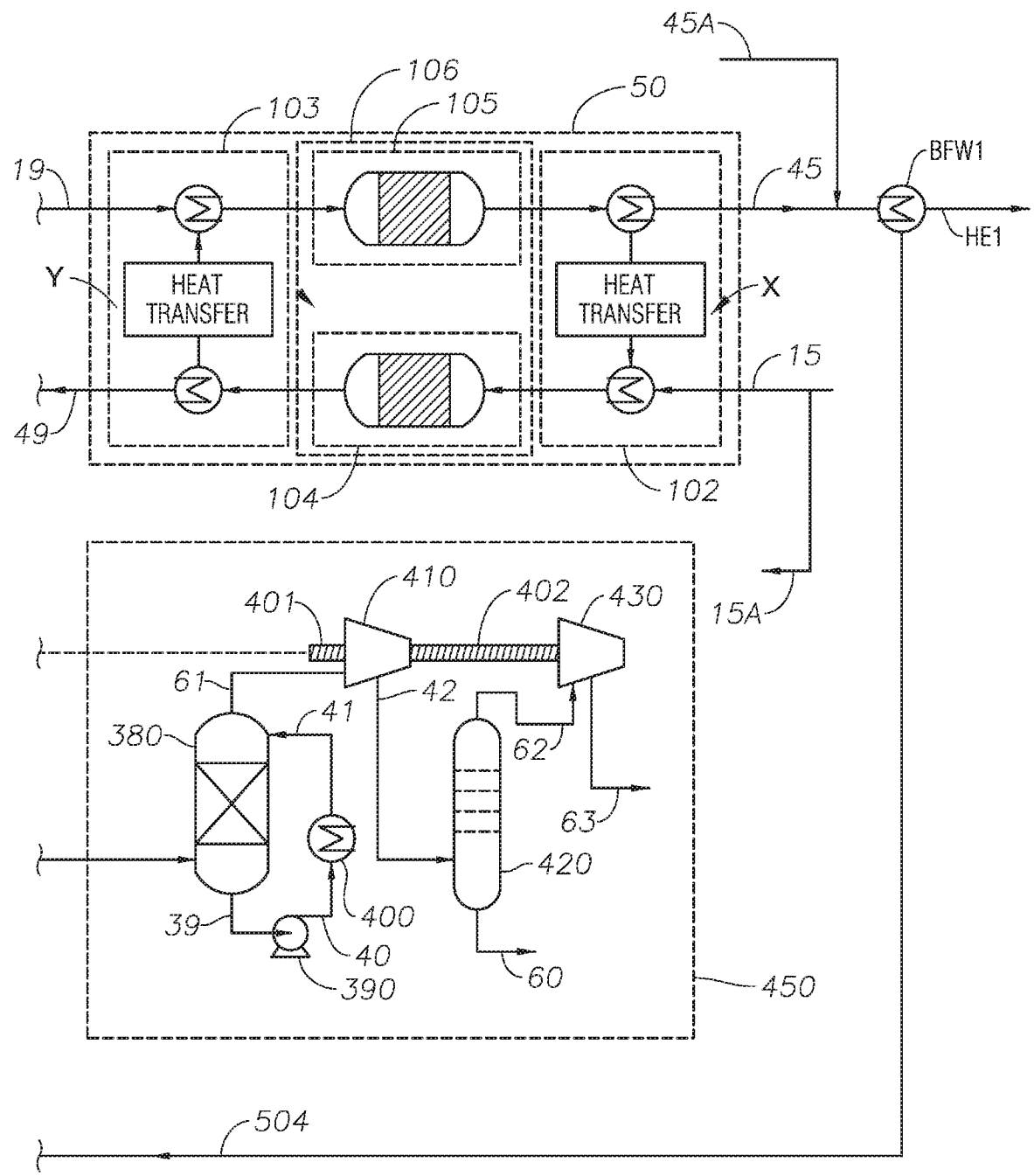

This prophetic example is carried out with reference to FIGS. 1A and B (system), 2 (first reverse-flow thermal pyrolysis reactor), and 4 (second reverse-flow thermal pyrolysis reactor). During a time interval of 5 seconds ($t_P=t_H=5$ seconds), atmospheric air (pressure of 1 bar, absolute, temperature of 25° C.) air is conducted via line 202 to compressor 202, which is powered by steam turbine 203. The air is compressed to a pressure of 1 bar (gauge) and is supplied to a first reverse-flow thermal pyrolysis reactor (FIG. 2) at an approach temperature $\Delta T_a^2$ of 150° C. at the start of the time interval. The reverse-flow thermal pyrolysis reactor contains thermal masses 1 and 7. The thermal masses comprise alumina and have an OFA of 25%. The compressed air is heated in second heat transfer zone 103 (unshaded region of thermal mass 7). The heated compressed air is combusted with fuel (not shown) under the specified combustion conditions in combustion zone 105 to produce 176 Mw of power, which produces a combustion effluent and transfers heat to reaction region 106 and first heat transfer zone 102. The combustion effluent at the outlet of the reactor (e.g., first opening 51 of FIG. 2) has a bulk gas temperature of about 600° C. at the start of the time interval, and a first approach temperature $\Delta T_a^1$ of 50° C. is established at location X (aperture 9 of FIG. 2) for the start of a subsequent pyrolysis mode. During the time interval, a pyrolysis feed comprising ethane (temperature of 25° C.) is conducted to a second reverse-flow thermal pyrolysis reactor (FIG. 4) via line 49A, the first and second reverse-flow thermal pyrolysis reactors being substantially similar. The feed approach temperature $\Delta T_a^1$ is 50° C. proximate to aperture 9 (FIG. 4) at the start of the time interval. The feed is pyrolysed under the specified conditions in a pyrolysis zone of length $l_c$ at the start of the pyrolysis to achieve an ethane conversion of 80%. Total residence time is 0.1 second, and the residence time in the pyrolysis zone is 0.03 second. $T_p$ is approximately 1200° C. at the start the time interval, and $\Delta T_p$ is about 100° C. $T_{MIN}$ is about 950° C., and the bulk gas temperature profiles $PR_3$ and $PR_4$ are substantially as indicated in FIG. 4. The pyrolysis establishes a second approach temperature $\Delta T_a^2$ of 150° C. proximate to aperture 9 at the end of the time interval for the start of a subsequent heating mode. The process gas is separated from the pyrolysis effluent in the second heat transfer zone, and is conducted away from the second reverse-flow thermal pyrolysis reactor via second opening 51 (FIG. 4) and line 49A at a bulk gas temperature of 600° C. proximate to the second opening at the start of the time interval.

The combustion effluent is cooled against a first boiler feed water (BFW1, 25° C.) in a first heat exchanger (HE1), and then conducted away. Heated BFW1 is conducted via line 504 to furnace 501 in steam generation stage 500 to produce superheated steam, which is conducted to steam turbine 203 via line 503. Heat for steam generation stage 500 is provided via fired heater 502 which includes burners and a line for supplying natural gas fuel at a heating rate of 87 Mw. A second source of boiler feed water (BFW2, 25° C.) cools process gas 49 in a second heat exchanger (HE2) upstream of olefin recovery facility 450. Heated BFW2 is also conducted to steam generator 500 to produce additional superheated steam for line 503. Expansion of the superheated steam in steam turbine 203 powers compressor 202. Wet steam conducted away from steam turbine 203 via line 204 is condensed and pumped (not shown) for recycle to BFW1 and BFW1. Products comprising ethylene, ethane, propylene, propane, tail gas, and $C_{4+}$ hydrocarbon are recovered from the process gas in recovery facility 450. Process gas compressor stages 410 and 430 are powered by shaft power produced in gas turbine generator 300, which uses natural gas fuel at a heating rate of 83 Mw. The power dissipated to produce and recover the products is indicated in the Table.

Examples 2-4

Example 1 is repeated, except that the approach temperature $\Delta T_a^1$ is 100° C. (Example 2), 150° C. (Example 3), and 200° C. (Example 4). The power dissipated to produce and recover the products at each $\Delta T_a^1$ is indicated in the Table.

TABLE

| | $\Delta T_a^1$ | | | |
| --- | --- | --- | --- | --- |
| | 50° C. | 100° C. | 150° C. | 200° C. |
| Heating Mode Power Dissipated (First Reactor) (Mw) | 176 | 193 | 212 | 233 |
| Gas Turbine Power Dissipated (Mw) | 83 | 83 | 83 | 83 |
| Steam Generator Power Dissipated (Mw) | 87 | 81 | 76 | 69 |
| Total Power Dissipated (Mw) | 346 | 357 | 371 | 385 |
| Marginal Increase in Total Power Dissipated (%) for an Additional 50° C. Increase in $\Delta T_a^1$ | — | 3 | 4 | 4 |

As can be seen in the table, thermal efficiency degrades at approach temperatures $\Delta T_a^1$ greater than about 50° C. Moreover, the rate of thermal efficiency degradation increases as $\Delta T_a^1$ increases from >50° C. to about 150° C.

All patents, test procedures, and other documents cited herein, including priority documents, are fully incorporated by reference to the extent such disclosure is not inconsistent. It is not intended that the scope of the claims appended hereto be limited to the descriptions set forth herein but rather that the claims be construed as encompassing all the features of patentable novelty which reside herein, including all features which would be treated as equivalents thereof by those skilled in the art to which this disclosure pertains. When lower and upper limits are specified, ranges from any lower limit to any upper limit are expressly within the scope of the invention. The term "comprising" is synonymous with the term "including". When a composition, an element or a group of components is preceded with the transitional phrase "comprising", the same composition or group of components is within transitional phrases "consisting essentially of," "consisting of," "selected from the group of consisting of," or "is" preceding the recitation of the composition, component, or components, and vice versa.

The invention claimed is:

1. A hydrocarbon pyrolysis process, the process comprising:
   (a) providing a feed comprising hydrocarbon;
   (b) providing an elongated flow-through reactor having (i) an internal volume which includes a pre-heated first heat transfer zone, a pre-cooled second heat transfer zone, a pre-heated reaction zone located between the first and second heat transfer zones, and (ii) opposed first and second openings in fluidic communication with the internal volume;
   (c) during time interval having a duration $t_p$ that is ≥0.01 second carrying out at least:
      (i) introducing the feed through the first opening and toward the first heat transfer zone at an approach temperature proximate to the first opening ($\Delta T_a^1$) that is ≤50° C. at the start of $t_p$,
      (ii) transferring heat from the reactor to the feed in the first heat transfer zone, which cools the first heat transfer zone and heats the feed to a feed bulk gas feed temperature that is substantially equal to a minimum pyrolysis temperature ($T_{MIN}$) wherein $T_{MIN}$ is ≥800° C.,
      (iii) pyrolysing at least a portion of the heated feed's hydrocarbon in the reaction zone under pyrolysis conditions including a pyrolysis bulk gas temperature ≥$T_{MIN}$, which pyrolysis cools the reaction zone and produces a pyrolysis product comprising coke, molecular hydrogen, and ethylene,
      (iv) transferring heat from the pyrolysis product to the reactor in the second heat transfer zone which cools the pyrolysis product, deposits coke in the second heat transfer zone, and produces a process gas comprising at least a portion of the pyrolysis effluent's molecular hydrogen and ethylene, and
      (v) conducting the process gas away from the reactor, the process gas having a bulk gas temperature of ≤600° C. proximate to the second opening at the start of $t_p$.

2. The process of claim 1, wherein $\Delta T_a^1$ at the start of $t_p$ is ≤45° C., and the bulk gas temperature of the process gas is ≤550° C. proximate to the second aperture of the second thermal mass at the start of $t_p$.

3. The process of claim 1, wherein $\Delta T_a^1$ at the start of $t_p$ in a range of from 5° C. to 45° C., and the bulk gas temperature of the process gas is in the range of from 450° C. to 550° C. proximate to the second aperture of the second thermal mass at the start of the pyrolysis.

4. The process of claim 1, wherein $t_p$ is in the range of about 0.5 second to 10 seconds.

5. The process of claim 1, wherein (i) the reactor exhibits a peak gas temperature ($T_p$) in the internal volume, (ii) $T_p$ is located in the reaction zone, and (iii) the pyrolysis conditions at the start $t_p$ include $T_p$ ≥900° C., a partial pressure of ≥7 psia (48 kPa), a total pressure of ≥5 psig (34 kPag), and a total gas residence time ≥0.01.

6. The process of claim 5, wherein, the total gas residence time is in the range of from 0.1 second to 1.0 second.

7. The process of claim 5, wherein $T_p$ decreases monotonically during $t_p$, and the location of $T_p$ remains substantially constant during the pyrolysis.

8. The process of claim 1, wherein the feed comprises one or more of ethane, propane, butanes, saturated and unsaturated $C_6$ hydrocarbon, including those derived from one or more of Fischer-Tropsch synthesis products, shale gas, biogas, associated gas, natural gas and mixtures or components thereof, steam cracked gas oil and residues, gas oils, heating oil, jet fuel, diesel, kerosene, gasoline, naphtha (including coker naphtha, steam cracked naphtha, and catalytically cracked naphtha), hydrocrackate, reformate, raffinate reformate, Fischer-Tropsch liquids, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum, $C_4$—residue admixture, naphtha—residue admixture, cracked feed, coker distillate streams, and hydrocarbon streams derived from plant or animal matter.

9. The process of claim 1, wherein (i)≥90 wt. % of the feed is liquid and/or solid at a temperature of about 566° C. and a pressure of about 1 bar absolute, and (ii) $T_{MIN}$ is ≥1000° C.

10. The process of claim 1, further comprising (i) terminating the pyrolysis after $t_p$, (ii) reheating the first heat transfer zone, reheating the reaction zone, and re-cooling the second heat transfer zone during a time interval $t_H$, and (iii) repeating step (c).

11. A hydrocarbon pyrolysis process, the process comprising:
   (a) providing an oxidant, a fuel, and a feed comprising hydrocarbon;
   (b) providing an elongated thermal pyrolysis reactor having (i) an internal volume which includes a pre-heated first heat transfer zone, a pre-cooled second heat transfer zone, a preheated reaction zone located between the first and second heat transfer zones, and (ii) opposed first and second openings in fluidic communication with the internal volume;
   (c) during a first time interval having a duration $t_p$ carrying out at least:
      (i) introducing the feed through the first opening, and toward the first heat transfer zone,
      (ii) transferring heat from the reactor to the feed in the first heat transfer zone, which cools the first heat transfer zone and heats the feed to achieve a bulk gas temperature $T_A$ at a location adjacent to the first heat transfer zone the reaction zone, wherein $T_A$ is substantially equal to a minimum pyrolysis temperature ($T_{MIN}$) during $t_p$, and $T_{MIN}$ is ≥800° C.,
      (iii) pyrolysing at least a portion of the heated feed's hydrocarbon in the reaction zone under pyrolysis conditions including an average reaction zone temperature ($T_{av}$), wherein (A) $T_{av}$ is ≥$T_{MIN}$+10° C. at the start of $t_p$, (B) the pyrolysis cools the reaction zone, and (C) the pyrolysis produces a pyrolysis product comprising coke, molecular hydrogen, and ethylene,
      (iv) transferring heat from the pyrolysis product to the reactor in the second heat transfer zone which (A) cools the pyrolysis product from a bulk gas temperature $T_B$ at a location adjacent to the reaction zone and the second heat transfer zone to a bulk gas temperature of ≤600° C. proximate to the second opening at the start of $t_p$, wherein TB is substantially equal to $T_{MIN}$ during $t_p$, (B) deposits coke in the second heat transfer zone, and (C) produces a process gas comprising at least a portion of the pyrolysis effluent's molecular hydrogen, ethylene, and propylene, and (v) conducting the process gas away from the reactor, the process gas having a bulk gas temperature of ≤600° C. proximate to the second opening at the start of $t_p$;

(d) during a second time interval having a duration $t_H$ which occurs after $t_p$, carrying out at least:

(i) introducing at least a portion of the oxidant through the second opening and into the second heat transfer zone, (ii) transferring heat from the reactor to the oxidant in the second heat transfer zone, which heats the oxidant and re-cools the second heat transfer zone, (iii) conducting the heated oxidant to the reaction zone and combusting in the reaction zone at least a portion of the heated oxidant with at least a portion of the fuel under combustion conditions, which re-heats the reaction zone and produces a combustion product, (iv) transferring heat from the combustion product to the reactor in the first heat transfer zone, which re-heats the first heat transfer zone and cools the combustion product, and (v) conducting the cooled combustion product away from the reactor via the first opening, wherein the combustion product has a bulk gas temperature of ≤600° C. proximate to the first opening at the start of $t_H$; and then (e) repeating step (c) and (d), wherein one or more of $t_p$, the pyrolysis conditions, $t_H$, and the combustion conditions is pre-selected to achieve an approach temperature proximate to the first opening ("$\Delta T_a^1$") that is ≤50° C. at the start of $t_p$ and a second approach temperature proximate to the second opening ("$\Delta T_a^2$") that is ≤125° C. at the start of $t_H$.

12. The process of claim 11, wherein (i) the pyrolysis conditions further include a partial pressure of ≥7 psia (48 kPa), an average total pressure of ≥5 psig (34 kPag), and a total gas residence time in the range of from 0.01 second to 0.8 second, (ii) ($\Delta T_a^1$ ≤40° C., and (iii) $\Delta T_a^2$ ≤100° C.

13. The process of claim 11, wherein $t_p$ is in a range of from 0.5 second to 10 seconds.

14. The process of claim 11, wherein the feed comprises one or more of ethane, propane, butanes, saturated and unsaturated $C_6$ hydrocarbon, including those derived from one or more of Fischer-Tropsch synthesis products, shale gas, biogas, associated gas, natural gas and mixtures or components thereof, steam cracked gas oil and residues, gas oils, heating oil, jet fuel, diesel, kerosene, gasoline, naphtha (including coker naphtha, steam cracked naphtha, and catalytically cracked naphtha), hydrocrackate, reformate, raffinate reformate, Fischer-Tropsch liquids, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum, $C_4$—residue admixture, naphtha—residue admixture, cracked feed, coker distillate streams, and hydrocarbon streams derived from plant or animal matter.

15. The process of claim 11, wherein (i)≥90 wt. % of the feed is liquid and/or solid at 566° C. and 1 bar absolute, and (ii) $T_{MIN}$ is ≥900° C.

16. The process of claim 11, wherein the reactor exhibits a peak gas temperature ($T_p$) in the internal volume, (ii) $T_p$ is located in the reaction zone, and (iii) $T_p$ monotonically decreases during $t_p$, (iv) the location of $T_p$ is substantially constant during $t_p$, and (v) $T_p$ is ≥1000° C. at the start of $t_p$.

17. The process of claim 11, wherein (i) the first heat transfer zone exhibits a monotonically increasing bulk gas temperature inward toward the reaction zone during $t_p$, (ii) $T_{av}$ is in the range of from 900° C. to 1100° C. at the start of $t_p$, and (iii) the second heat transfer zone exhibits a monotonically decreasing bulk gas temperature outward away from the reaction zone during $t_p$.

18. The process of claim 11, wherein the fuel comprises one or more of molecular hydrogen, carbon monoxide, methane, and ethane.

19. The process of claim 11, wherein the oxidant comprises one or more of molecular oxygen, oxygen in air, air, and oxygen-enriched air.

20. The process of claim 16, wherein (i) the reaction zone exhibits a first gas temperature profile at the start of $t_p$, the reaction zone exhibits a second gas temperature profile at the end of $t_p$, (ii) $T_p$ at the end of $t_p$ is no more than 100° C. less than $T_p$ at the start of $t_p$, and the second bulk gas temperature profile is substantially congruent with the first bulk temperature profile.

21. A hydrocarbon pyrolysis process, the process comprising:

(a) providing a feed comprising $C_{2+}$ hydrocarbon;

(b) providing an elongated reverse-flow thermal pyrolysis reactor having (i) an internal volume which includes at least a first heat transfer zone, a second heat transfer zone opposed to the first heat transfer zone, and a reaction zone located between the first and second heat transfer zone and (ii) opposed first and second openings in fluidic communication with the internal volume, wherein the first and second openings are separated by a reactor length ($L_R$);

(c) providing a pre-heated first thermal mass, at least a segment of which is located in the first heat transfer zone, wherein (i) the thermal mass includes first and second apertures and at least one internal channel, (ii) the first and second apertures are in fluidic communication with the channel, and are separated by a flow-path of length $L_1$ through the channel, (iii) $L_1$ is in the range of from 0.1 * $L_R$ to 0.9 * $L_R$, and (iv) the first opening is proximate to the first aperture;

(d) providing a precooled second thermal mass, at least a segment of which is located in the second heat transfer zone, wherein (i) the thermal mass includes first and second apertures and at least one internal channel, (ii) the first and second apertures are in fluidic communication with the channel, and are separated by a flow-path of length $L_2$ through the channel, (iii) $L_2$ is in the range of from 0.1 * $L_R$ to 0.9 * $L_R$, and (iv) the second opening is proximate to the second aperture;

(e) establishing a flow of the feed in the channel toward the second aperture during a time interval $t_p$ by introducing the feed through the first opening and through the first aperture;

(f) transferring heat from the heated thermal mass to the feed in at least the first heat transfer zone, the heat transfer occurring at least in the channel;

(g) pyrolysing in the reaction zone at least a portion of the heated feed's $C_{2+}$ hydrocarbon under pyrolysis conditions to produce a pyrolysis product, wherein the pyrolysis product comprises coke, molecular hydrogen, ethylene and propylene, and wherein the pyrolysis conditions include:

(i) a first bulk gas temperature profile at the start of the pyrolysis which increases substantially monotonically from a first temperature ($T_1$) proximate to the first aperture to a second temperature ($T_2$) proximate to the second aperture, wherein $T_1$ is $\geq 250°$ C. and $T_2$ is in the range of from 800° C. to 1400° C.;
  (ii) an approach temperature proximate to the first aperture ($\Delta T_a^1$) which at the start of the pyrolysis is $\leq 50°$ C.; and
  (iii) a peak gas temperature ($T_p$) within the reactor, wherein $T_p$ is located in the reaction zone;
(h) conducting a flow of the pyrolysis product through the channel of the second thermal mass toward the second aperture of the second thermal mass, and transferring heat from the pyrolysis product to the second thermal mass which
  (i) heats the second thermal mass,
  (ii) deposits at least portion of the coke in the channel of the second thermal mass, and
  (iii) produces a process gas comprising at least a portion of the pyrolysis product's molecular hydrogen, ethylene, and propylene, and
(i) conducting the process gas out of the second aperture of the second thermal mass, out of the second opening, and away from the flow-through reactor, the process gas having a bulk gas temperature of $\leq 600°$ C. proximate to the second aperture of the second thermal mass at the start of the pyrolysis.

22. The process of claim 21, further comprising reheating the first thermal mass, reheating the reaction zone, and re-cooling the second thermal mass during a second time duration $t_H$ after $t_p$, and repeating steps (e) through (i).

* * * * *